(12) United States Patent
Meyer et al.

(10) Patent No.: US 12,271,732 B1
(45) Date of Patent: * Apr. 8, 2025

(54) CONFIGURATION OF A DEEP VECTOR ENGINE USING AN OPCODE TABLE, CONTROL TABLE, AND DATAPATH TABLE

(71) Applicant: Amazon Technologies, Inc., Seattle, WA (US)

(72) Inventors: Paul Gilbert Meyer, Nashville, VT (US); Ron Diamant, Santa Clara, CA (US); Sundeep Amirineni, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,333

(22) Filed: Sep. 30, 2022

(51) Int. Cl.
*G06F 9/22* (2006.01)
*G06F 9/30* (2018.01)
*G06F 9/38* (2018.01)
*G06F 15/78* (2006.01)

(52) U.S. Cl.
CPC ............ *G06F 9/223* (2013.01); *G06F 9/3016* (2013.01); *G06F 9/3804* (2013.01); *G06F 15/7878* (2013.01); *G06F 15/7882* (2013.01)

(58) Field of Classification Search
CPC ... G06F 9/06; G06F 9/22; G06F 9/223; G06F 9/3016; G06F 9/3804; G06F 15/7867; G06F 15/7871; G06F 15/7878; G06F 15/7882
See application file for complete search history.

(56) References Cited

U.S. PATENT DOCUMENTS

| | | | |
|---|---|---|---|
| 5,117,498 A | 5/1992 | Miller et al. | |
| 6,052,773 A * | 4/2000 | DeHon | G06F 9/30181 |
| | | | 712/229 |
| 6,105,105 A | 8/2000 | Trimberger | |
| 6,654,730 B1 | 11/2003 | Kato et al. | |
| 6,757,284 B1 | 6/2004 | Galles | |
| 7,755,631 B1 | 7/2010 | Mrazek et al. | |
| 8,121,235 B1 | 2/2012 | Sun et al. | |

(Continued)

FOREIGN PATENT DOCUMENTS

GB    2311882 A  * 10/1997  ......... G06F 15/8007

OTHER PUBLICATIONS

Jacob et al., "Memory Interfacing and Instruction Specification for Reconfigurable Processors", ACM, 1999, pp. 145-154.*

(Continued)

*Primary Examiner* — David J. Huisman
(74) *Attorney, Agent, or Firm* — Weaver Austin Villeneuve & Sampson LLP

(57) ABSTRACT

A technique to program a compute channel having multiple computational circuit blocks coupled in series in a pipeline can include receiving a machine instruction for the compute channel. The machine instruction is decoded to obtain an opcode, and the opcode can be used as an index to access an opcode entry in an opcode table. The opcode entry contains a pointer to a microoperation, and the pointer can be used to access a microoperation represented by a control entry in a control table and a datapath configuration entry in a datapath table. The microoperation can then be issued to the compute channel by configuring the compute channel with the control entry and the datapath configuration entry.

20 Claims, 12 Drawing Sheets

(56) References Cited

U.S. PATENT DOCUMENTS

| | | | |
|---|---|---|---|
| 9,495,154 | B2 | 11/2016 | Khan |
| 9,710,265 | B1 | 7/2017 | Temam et al. |
| 10,120,580 | B2 | 11/2018 | Olcay |
| 10,157,333 | B1 | 12/2018 | Wang et al. |
| 10,210,860 | B1 | 2/2019 | Ward et al. |
| 10,592,250 | B1 | 3/2020 | Diamant et al. |
| 10,831,507 | B2 | 11/2020 | Shah et al. |
| 10,942,742 | B1 | 3/2021 | Diamant et al. |
| 11,182,337 | B1 | 11/2021 | Maiyuran et al. |
| 12,072,836 | B2 | 8/2024 | Shah et al. |
| 2004/0230784 | A1 | 11/2004 | Cohen |
| 2005/0273481 | A1 | 12/2005 | Dent |
| 2006/0095739 | A1 | 5/2006 | Selvaggi et al. |
| 2006/0253689 | A1* | 11/2006 | Knowles ............ G06F 15/7867 712/E9.035 |
| 2007/0073922 | A1 | 3/2007 | Go et al. |
| 2007/0240142 | A1 | 10/2007 | Brokenshire et al. |
| 2009/0119460 | A1 | 5/2009 | Lin et al. |
| 2009/0293048 | A1 | 11/2009 | Chen et al. |
| 2013/0258376 | A1 | 10/2013 | Tsuchiya |
| 2014/0317333 | A1 | 10/2014 | Dorst et al. |
| 2015/0277924 | A1 | 10/2015 | Zappulla et al. |
| 2018/0113006 | A1 | 4/2018 | Tyrer |
| 2018/0253877 | A1 | 9/2018 | Kozub et al. |
| 2019/0034785 | A1 | 1/2019 | Murray et al. |
| 2019/0266217 | A1 | 8/2019 | Arakawa et al. |
| 2020/0211189 | A1 | 7/2020 | Yip et al. |
| 2020/0342632 | A1 | 10/2020 | Frumkin et al. |
| 2020/0356837 | A1 | 11/2020 | Hargil et al. |
| 2022/0343137 | A1 | 10/2022 | Surendran et al. |
| 2022/0405556 | A1 | 12/2022 | Lichtenau et al. |
| 2022/0414182 | A1 | 12/2022 | Adelman et al. |
| 2023/0019151 | A1 | 1/2023 | Ahmadi et al. |
| 2024/0103813 | A1 | 3/2024 | Tan et al. |
| 2024/0111528 | A1 | 4/2024 | Tan et al. |
| 2024/0264975 | A1 | 8/2024 | Li et al. |
| 2024/0303218 | A1 | 9/2024 | Zhao et al. |

OTHER PUBLICATIONS

Stack Overflow, "Search max value and index inside Nested list", 2013, 3 pages, URL: https://stackoverflow.com/questions/18616793/search-max-value-and-index-inside-nested-list [retrieved on Feb. 27, 2023].

Stack Overflow, "How do I get indices of N maximum values in a NumPy array?", 2011, 16 pages, URL: https://stackoverflow.com/questions/6910641/how-do-i-get-indices-of-n-maximum-values-in-a-numpy-array [retrieved on Feb. 28, 2023].

International Search Report and Written Opinion dated Nov. 2, 2023 in PCT Application No. PCT/US2023/073800.

Cook, J., "Accurately Computing Running Variance", John D. Cook Consulting [blog], Nov. 1, 2014, pp. 1-3, URL: https://www.johndcook.com/blog/standard_deviation/ [retrieved on Feb. 8, 2023].

Ioffe, S. et al., "Batch Normalization: Accelerating Deep Network Training by Reducing Internal Covariate Shift", 32nd International Conference on Machine Learning (ICML 15), Mar. 2, 2015, pp. 1-11, URL: https://arxiv.org/abs/1502.03167v3.

U.S. Appl. No. 17/447,675, inventor Meyer, filed Sep. 14, 2021.

U.S. Appl. No. 17/447,677, inventor Meyer, filed Sep. 14, 2021.

U.S. Appl. No. 17/934,145, inventors Tan et al., filed Sep. 21, 2022.

U.S. Appl. No. 17/934,147, inventors Tan et al., filed Sep. 21, 2022.

U.S. Appl. No. 17/935,415, inventors Meyer et al., filed Sep. 26, 2022.

U.S. Appl. No. 17/935,419, inventors Meyer et al., filed Sep. 26, 2022.

U.S. Appl. No. 17/937,329, inventors Meyer et al., filed Sep. 30, 2022.

U.S. Appl. No. 17/937,335, inventors Meyer et al., filed Sep. 30, 2022.

Wikipedia [webpage], "Algorithms for calculating variance", Mar. 24, 2001, pp. 1-14, URL: https://en.wikipedia.org/wiki/Algorithms_for_calculating_variance [retrieved on Feb. 8, 2023].

U.S. Final Office Action dated Dec. 26, 2023 in U.S. Appl. No. 17/447,677.

U.S. Corrected Notice of Allowability dated Feb. 12, 2024 in U.S. Appl. No. 17/934,147.

U.S. Notice of Allowance dated Jan. 31, 2024 in U.S. Appl. No. 17/934,147.

U.S. Notice of Allowance dated Mar. 13, 2024 in U.S. Appl. No. 17/447,677.

U.S. Non-Final Office Action dated Jun. 21, 2024 in U.S. Appl. No. 17/937,335.

U.S. Notice of Allowance dated Oct. 7, 2024 in U.S. Appl. No. 17/937,335.

* cited by examiner

CONFIGURATION OF A DEEP VECTOR ENGINE USING AN OPCODE TABLE, CONTROL TABLE, AND DATAPATH TABLE

BACKGROUND

Neural networks utilize computational models to perform complex tasks. A neural network can perform computations using a set of weights. Through these computations, the weights are combined with input data (which can also be referred to as feature maps) through multiple layers to perform an inference operation. For example, a neural network model can be used in natural language processing to translate and understanding human language, or in computer vision systems to analyze and react to images and video frames. The weights used in a specific neural network can be determined via a training process in which the weight values are tuned to yield better predictions.

BRIEF DESCRIPTION OF THE DRAWINGS

Various embodiments in accordance with the present disclosure will be described with reference to the drawings, in which.

DETAILED DESCRIPTION

Figure 1:
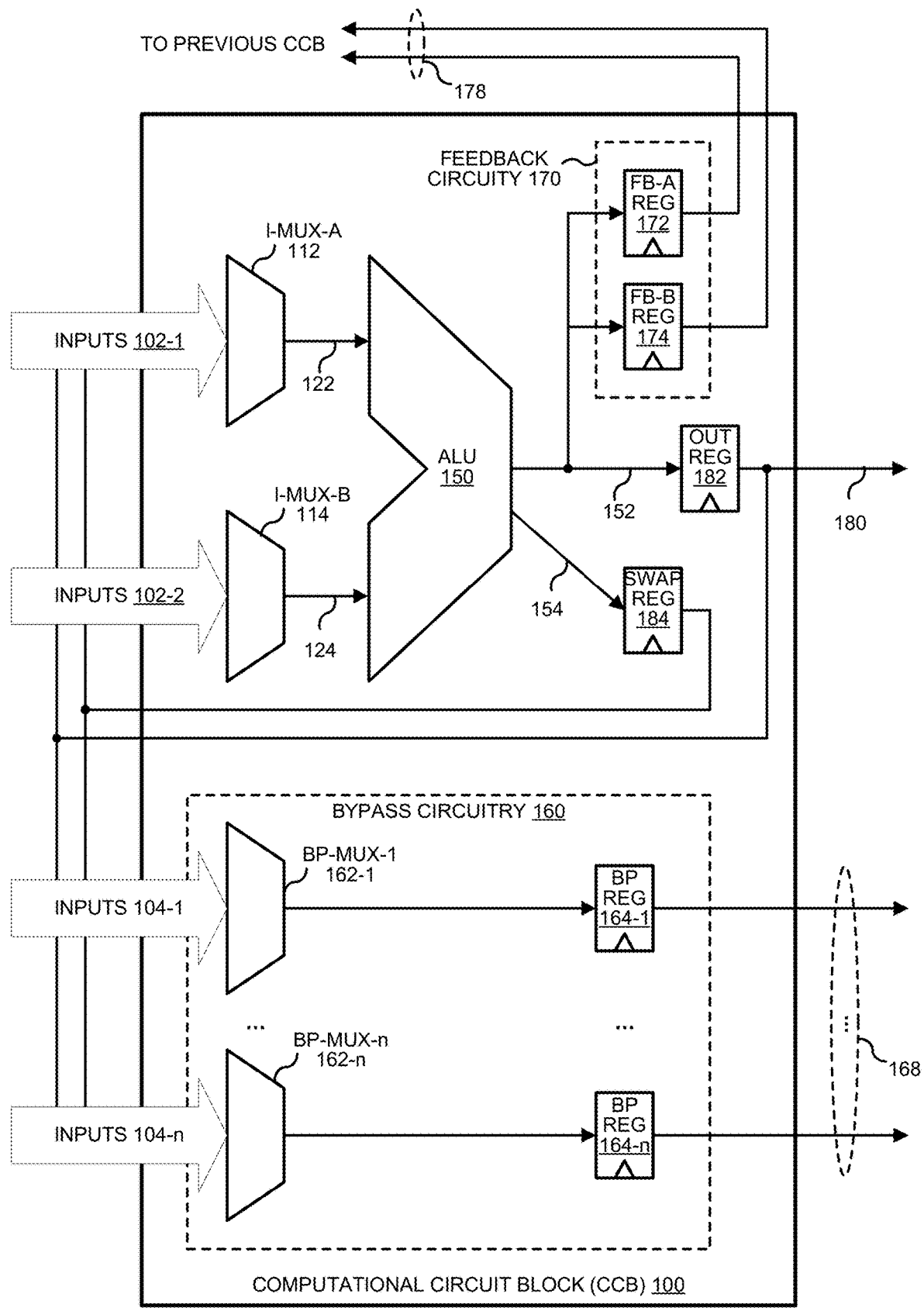
FIG. 1 illustrates a block diagram of an example of a computational circuit block.

Matrix multiplication is a common type of computation used in neural networks. As such, much effort has been made to improve execution of matrix multiplication operations in hardware. For example, a systolic array is a hardware architecture that can provide much better matrix multiplication throughput than a general-purpose processor. Although a systolic array can significantly improve matrix multiplication throughput, a neural network may utilize other types of computations that may not be suitable for execution in a systolic array. For example, batch normalization is a common neural network training technique to normalize input data using the mean and variance of data samples. As another example, pooling is a common neural network operation to down sample a data set by selecting a data element or combing data elements from a window size of data elements. Even if some of these other neural network computations can be executed in the systolic array, it may be advantageous to offload such computations to a separate compute engine to preserve the computational bandwidth of the systolic array for matrix multiplication operations.

One example of such a compute engine is a vector compute engine. The vector compute engine may include multiple compute channels that can be programmed to perform parallel computations such as calculating the mean and variance of tensors streamed into the compute engine. Each compute channel may include multiple computational circuit blocks or compute stages coupled in series to form a pipeline in which the output of one computational circuit block is fed as an input to the next computational circuit block. To provide high data throughput, input tensors can be streamed into the vector compute engine such that each compute channel receives a new data element to process at each clock cycle. For some computations, the operation and/or the configuration of a computational circuit block in the pipeline may have to change from one clock cycle to the next. Furthermore, certain complex computations may require long sequences of different configurations to be applied to the pipeline.

The techniques disclosed herein provide a programming architecture to allow complex computations to be implemented in a compute engine. A machine instruction that involves a series of computations to be performed in the compute engine can be mapped to a set of microoperations. Each microoperation may include control flow information to enable control logic to sequence through the set of microoperations. Each microoperation may also include a datapath configuration that is used to configure the computational circuit blocks of the pipeline of a compute channel when executing the microoperation. In addition to the compute pipeline formed by the multiple computational circuit blocks, a compute channel can also include a configuration pipeline to allow a datapath configuration to be streamed down the pipeline in parallel with an input data element. This allows a datapath configuration to follow a corresponding input data element such that sequential input data elements can be processed using completely different operations in the computational circuit blocks.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a block diagram of an example of a computational circuit block (CCB) 100 that can be implemented in a computational pipeline of an integrated circuit device. Computational circuit block 100 includes an arithmetic logic unit (ALU) circuit 150. ALU circuit 150 can be implemented to process floating-point numeric inputs of up to a certain bit length such as 32-bit floating point numbers (FP32). ALU circuit 150 can also be configurable to support numeric inputs of other datatypes such as 8-bit integers (INT8), 16-bit integers (INT16), 16-bit brain floating point numbers (BF16), 16-bit floating point numbers (FP16), or datatypes have a bit length that is less than or equal to the maximum supported datatype bit length. ALU circuit 150 includes a first numeric input 122 selected by an input multiplexor 112, a second numeric input 124 selected by an input multiplexor 114, and a primary result output 152. ALU circuit 150 can be programmed to perform various computational operations on first numeric input 122 and/or second numeric input 124 to generate primary result output 156.

For example, ALU circuit 150 can be programmed to generate primary result output 152 by selecting a computational operation from various available operations to perform on the numeric input(s). The computational operations may include one or more of a passthrough function (or identity function) of the first numeric input 122, bitwise inversion of the first numeric input 122, arithmetic left shift of the first numeric input 122 by a number of bits indicated by the second numeric input 124, arithmetic right shift of the first numeric input 122 by a number of bits indicated by the second numeric input 124, addition of the first numeric input 122 and the second numeric input 124, subtraction of the second numeric input 124 from the first numeric input 122, multiplication of the first numeric input 122 and the second numeric input 124, division of the first numeric input 122 by the second numeric input 124, select the maximum (MAX) of the first numeric input 122 and the second numeric input 124, select the minimum (MIN) of the first numeric input 122 and the second numeric input 124, bitwise AND of the first numeric input 122 and the second numeric input 124, bitwise OR of the first numeric input 122 and the second numeric input 124, bitwise XOR of the first numeric input 122 and the second numeric input 124, logical AND of the first numeric input 122 and the second numeric input 124, logical OR of the first numeric input 122 and the second numeric input 124, logical XOR of the first numeric input 122 and the second numeric input 124, logical left shift of the first numeric input 122 by a number of bits indicated by the second numeric input 124, logical right shift of the first numeric input 122 by a number of bits indicated by the second numeric input 124, etc. In some implementations, the computational operations may also include comparison functions such as whether the first numeric input 122 is equal to, not equal to, greater than, great than or equal to, less than or equal to, and/or less than the second numeric input 124, etc. Other supported computational operations may include an absolute difference between the first numeric input 122 and the second numeric input 124, selection of the first numeric input 122 or the second numeric input 124, and/or other functions to generate a value based on the first numeric input 122 and/or the second numeric input 124. ALU circuit 150 can also be programmed to apply the computational operation with the first numeric input 122 reversed with the second numeric input 124. In some implementations, the computational operation performed by ALU circuit 150 can be provided in a machine instruction. The machine instruction may also include a constant used by the computational operation. The input reversal setting can be used to reverse the order of the inputs for non-commutative computational operations given in the machine instruction. For example, for subtraction operations, the input reversal setting can be used to reverse the polarity of the result. Although various computational operations have been described, depending on the application and usage of ALU circuit 150, the computational logic within ALU circuit can be simplified to support fewer of the computational operations described above. In some implementations, ALU circuit 150 can also support other computational operations not specifically described.

ALU circuit 150 may include a secondary output 154 to loopback the first numeric input 122 or the second numeric input 124 to computational circuit block 100. This secondary output 154 can provide a swap out path for the ALU circuit 150 to retain a value that was inputted into the ALU circuit 150 (e.g., by storing the value in a swap register 184). This capability of ALU circuit 150 allows a computation pipeline composed of such ALU stages to provide native hardware support for ordering manipulations such as sorting a series of data elements, or finding and locating data elements of a vector being streamed into the pipeline. For example, when ALU circuit 150 is programmed to perform a maximum function, the larger of the first numeric input 122 and the second numeric input 124 can be outputted to the next ALU stage, and the other unselected numeric input can be outputted on the secondary output 154. Similarly, when ALU circuit 150 is programmed to perform a minimum function, the smaller of the first numeric input 122 and the second numeric input 124 can be outputted to the next ALU stage, and the other unselected numeric input can be outputted on the secondary output 154.

Computational circuit block 100 includes an output register 182 configured to receive the primary result output 152 of ALU circuit 150, and provide the primary result output 152 of ALU circuit 150 as the primary output 180 of computational circuit block 100 to the next CCB. By registering primary result output 152, pipeline stages of computational circuit blocks can be coupled in series to create a computational pipeline in which input values are operated on at each clock cycle by an ALU stage, and the result is provided to the next ALU stage for further processing in the next clock cycle. Computational circuit block 100 also includes a swap register 184 configured to receive the secondary output 154 of ALU circuit 150, and to feedback the secondary output 154 as one of the inputs to the computational circuit block 100 at the next clock cycle. As mentioned above, the swap register 184 can be used to store and retain a value being streamed into computational circuit block 100 to allow efficient sort, search, and/or locate functions to be performed.

Computational circuit block 100 may also include feedback circuitry 170 having one or more feedback registers that are each configured to receive the primary result output 152 of the ALU circuit 150, and provide the primary result output 152 of the ALU circuit 150 to a previous computational circuit block of the pipeline. In some implementations, the feedback circuitry 170 can include multiple feedback registers to enable computational circuit block 100 to maintain and store multiple running computational results on different sets of data elements being streamed into the pipeline. For instance, feedback circuitry 170 may include two feedback registers 172 and 174 that are each individually configured to receive the primary result output 152 of the ALU circuit 150 to feedback to the previous computational circuit block. Each of feedback registers 172 and 174 can have its own independent enable signals. During operation, computational circuit block 100 can be programmed to sequentially enable to the first feedback register 172 alternately with the second feedback register 174 at each clock cycle. Hence, the first feedback register 172 will be updated with the computational result of ALU circuit 150 every other clock cycle, and the second feedback register 174 will be updated with the computational result of ALU circuit 150 alternately in the clock cycles in between. This allows computational circuit block 100 to maintain a first computational result in feedback register 172 that are computed from odd sequenced data elements (e.g., first, third, fifth, etc. data elements being streamed into the pipeline), and a second computational result in feedback register 174 that are computed from even sequenced data elements (e.g., second, fourth, sixth, etc. data elements being streamed into the pipeline). For example, feedback register 172 can be used to maintain a running sum of the odd sequenced data elements of an input vector, and feedback register 174 can be used to maintain a running sum of the even sequenced data elements of the input vector. By controlling the independent enables of the feedback registers, running computational results of various data patterns can be achieved.

Computational circuit block 100 may also include bypass circuitry 160 having one or more bypass circuits each including a bypass multiplexor coupled to a bypass delay register. Each bypass circuit is operable to independently select one of the inputs of computational circuit block 100 to output to the next computational circuit block of the pipeline on bypass output 168. For example, bypass circuitry 160 may include bypass multiplexor 162-1 to select an input for bypass delay register 164-1, and bypass multiplexor 162-n to select an input for bypass delay register 164-n. In some implementations, computational circuit block 100 may include, for example, at least three bypass circuits, six bypass circuits, or other number of bypass circuits. When coupled in a pipeline, bypass circuitry 160 enables an input data element or an intermediate computational result to be provided to different ALU stages in the pipeline. Bypass circuitry 160 also provides the capability for the different ALU stages to receive independent inputs, and allows the different ALU stages in the pipeline to operate independently on different sets of inputs.

Computational circuit block 100 may include an input multiplexor for each of the numeric inputs of the ALU circuit 150, as well as a bypass multiplexor for each of the one or more bypass circuits. In the implementation shown in FIG. 1, computational circuit block 100 has input multiplexors 112 and 114, and bypass multiplexors 162-1 to 162-n. Each of these multiplexors may independently select an input from a set of inputs of the computational circuit block 100. For example, input multiplexor 112 may select an input from the set of inputs 102-1 to provide as the first numeric input 122 for ALU circuit 150; input multiplexor 114 may select an input from the set of inputs 102-2 to provide as the second numeric input 124 for ALU circuit 150; bypass multiplexor 162-1 may select an input from the set of inputs 104-1 to provide to bypass delay register 164-1; and bypass multiplexor 162-n may select an input from the set of inputs 104-n to provide to bypass delay register 164-n.

Each set of inputs 102-1, 102-2, 104-1, and 104-n may include one or more of the following inputs: a primary output of the previous computational circuit block of the pipeline (or an input to the pipeline if it is the first computational circuit block), any of the outputs of the bypass circuits of the previous computational circuit block (or one of the inputs to the pipeline if it is the first computational circuit block), the primary output 180 of the computational circuit block 100 itself, the output of the swap register 184, and/or any of the outputs of the feedback registers from the next computational circuit block. In some implementations, the set of inputs 104-1 to 104-n selectable by each of the bypass multiplexors can be the same set of inputs, and the set of inputs 102-1 and 102-2 selectable by each of the input multiplexors can be the same set of inputs. Furthermore, the set of inputs 104-1 to 104-n can be the same as the set of inputs 102-1 and 102-2. Having each of the multiplexors able to select from the full set of inputs available to the computational circuit block 100 provides flexibility to program the computational circuit block 100 to perform various types of computations. Nevertheless, in some implementations, any one or more of the sets of inputs 102-1, 102-2, and 104-1 to 104-n may contain one or more inputs that are not available in another set of inputs, or may lack one or more inputs that are included in another set of inputs.

It should be noted that although computational circuit block 100 has been shown in FIG. 1 to include various features such as bypass circuitry 160, feedback circuitry 170, and swap register 184, other implementations of the computational circuit block may omit one or more components shown in FIG. 1. For example, a computational circuit block may include just one feedback register, or just one bypass circuit, or may include bypass circuitry without feedback circuitry, etc. Furthermore, computational circuit block 100 may include additional components not specifically shown.

Figure 2:
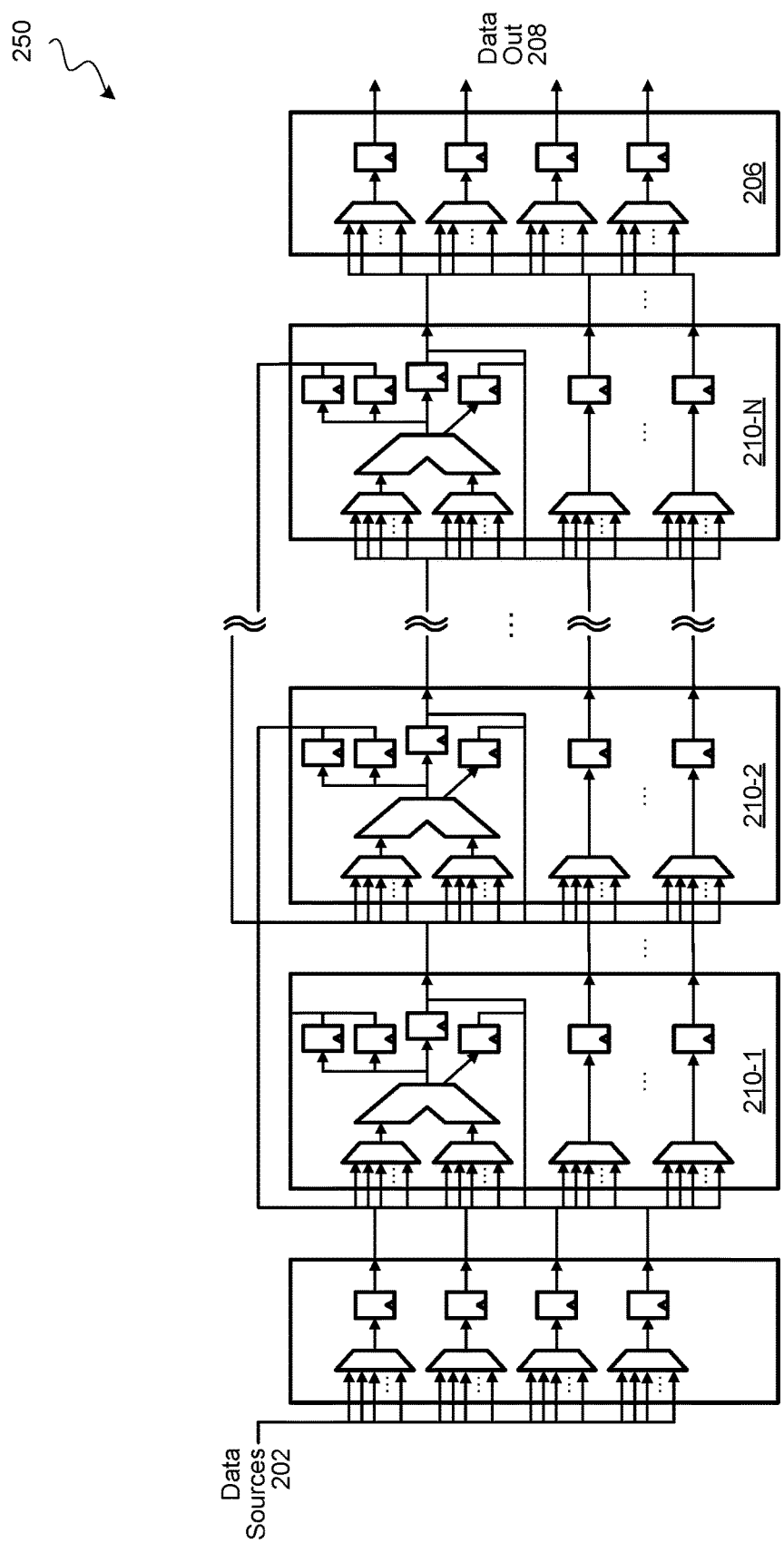
FIG. 2 illustrates a block diagram of an example of a compute channel.

FIG. 2 illustrates an example of an integrated circuit 250 implementing a compute channel formed by coupling multiple computational circuit blocks in series in a pipeline. Integrated circuit 250 can be, for example, part of a compute engine of a data processor (e.g., a data processing integrated circuit device such as a processor, a graphics processor, a digital signal processor, a tensor processor, a neural network accelerator, or other types of application specific integrated circuits). Integrated circuit 250 includes multiple computational circuit blocks 210-1 to 210-N coupled in series. The number of computational circuit blocks N can be at least four, at least eight, at least ten, at least sixteen, or other suitable number. Each computational circuit block in integrated circuit 250 can be implemented, for example, using computational circuit block 100. It should be noted that not each of the computational circuit blocks 210-1 to 210-N needs to be identical. For example, the first computational circuit blocks 210-1 does not have a previous computational circuit block to receive feedback outputs from the feedback circuitry. As such, the feedback circuitry can be omitted from the first computational circuit blocks 210-1. More generally, the components provided in each computational circuit block in the pipeline can be the same, or can vary depending on the application.

Each of computational circuit blocks 210-1 to 210-N includes an ALU circuit, and thus the pipeline in integrated circuit 250 can be considered as an ALU pipeline having multiple ALU stages coupled in series. Each ALU stage has a first numeric input, a second numeric input, and a primary result output. Each of the ALU stage is programmable to perform a computational operation on the first numeric input and/or the second numeric input of the ALU stage to generate the primary result output. The primary result output is provided to the next computational circuit block, which may select that primary result output as one of the numeric inputs to the ALU. For example, the primary result output of computational circuit block 210-1 is provided as an input to computational circuit block 210-2, and computational circuit block 210-2 may select the primary result output of computational circuit block 210-1 as one of the numeric inputs to the ALU stage of computational circuit block 210-2. Computational circuit block 210-2 can also select the primary result output of computational circuit block 210-1 to bypass the ALU stage and be outputted to the next computational circuit block 210-3 using the bypass circuitry.

Each of computational circuit blocks 210-1 to 210-N can be independently configured such that some or all of the ALU stages perform a different computational operation. Likewise, some or all of the ALU stages in the pipeline can be configured to perform the same computational operation. In some implementations, the multiplexors at the input interface of each computational circuit block can be independently configured to select any of the inputs that the computational circuit block receives. The bypass circuitry provided in each computational circuit block can also allow the computational circuit blocks in the pipeline to operate independently on different inputs.

For instance, a first set of inputs can flow into the first ALU stage of computational circuit block 210-1, and the result of the first ALU stage can flow into the second ALU stage of computational circuit block 210-2. The result of the second ALU stage of computational circuit block 210-2 can then be provided along a bypass path. For example, the bypass multiplexor of the next computational circuit block can select the primary output of computational circuit block 210-2, and provide the primary output of computational circuit block 210-2 along the bypass path down the pipeline to the subsequent computational circuit blocks. The primary output of computational circuit block 210-2 can be outputted by the bypass circuitry of the last computational circuit block 210-N.

Meanwhile, a second set of inputs can be provided along the bypass circuitry of computational circuit blocks 210-1 and 210-2. The input multiplexors for the ALU stage of the next computational circuit block can select this second set of inputs as the numeric inputs for the ALU. For example, the first input multiplexor and the second input multiplexor can select respective outputs of the bypass circuits of computational circuit block 210-2 to be used as the numeric inputs to the ALU circuit. The remaining ALU stages in the pipeline can operate on the result from this ALU circuit with the final result being outputted as the primary output of the last ALU stage of computational circuit block 210-N.

Hence, in this specific example, the first two ALU stages operate together on a first set of inputs, and the remaining ALU stages operate together on a second set of inputs. The bypass circuitry allows the two groups of ALU stages to operate independently from each other. In other scenarios, it's also possible to have two groups of ALU stages operate independently, and the results can be combined at a later ALU stage. These are just a few examples of the flexibility that the bypass circuitry provides on different ways that the pipeline can be configured and utilized.

In some implementations, the ALU pipeline can be designed to have no stalls such that data elements can be streamed into the pipeline at every clock cycle to maximize throughput. In other words, the pipeline can be designed to process a new data element at every clock cycle. In some scenarios, a data bubble (e.g., clock cycle with no valid data) may occur in the data stream inputted into the pipeline. This may occur, for example, if the memory providing the data elements to the pipeline or the memory being written with the computational result outputted from the pipeline is busy or reaches a bandwidth limit, causing a temporary pause in the data flow. In such scenarios, a nop (no operation) instruction can be executed by the ALU pipeline in each clock cycle of the temporary pause until the data stream resumes.

Certain computations may require multiple operations to be performed on a previous computational result to derive to an updated computational result from a new data element being streamed into the pipeline. For computations that may have multicycle feedback loops, the computational circuit block feeding back the running computational results can be implemented with multiple feedback registers. When a data bubble is encountered, the computational circuit block can safely maintain the separate running computational results, for example, by using a first feedback register to store the first running computation for the odd sequenced data elements, and a second feedback register to store the second running computation for the even sequenced data elements. During operation, the enables for the two feedback registers can be alternately toggled such that one feedback register tracks the odd running computation, and the other feedback register tracks the even running computation. When a pause in the data stream is encountered, the enable signals to the two feedback registers can be disabled such that the two running computations are retained and stored separately in the two feedback registers. When the data stream is restarted, the alternate toggling of the enables for the two feedback registers can be resumed to continue tracking the two running computations in the separate feedback registers. Hence, by having multiple feedback registers to maintain and store respective running computational results, data bubbles in the data stream can be handled properly without causing the running computational results to go out of synch.

In addition to the computational circuit blocks 210-1 to 210-N, integrated circuit 200 may also include an input circuit 204 and an output circuit 206. Input circuit 204 is operable to provide input data selectable from multiple data sources 202 to the pipeline of computational circuit blocks 210-1 to 210-N. Data sources 202 may include data being read from a memory (e.g., a buffer memory storing tensor data elements), as well as other data sources. In some implementations, the data being read from memory can be provided by a memory read interface circuit via multiple virtual input ports, and the input circuit 204 can select one or more of the virtual input ports as a data source for the compute channel 250.

Other examples of data sources 202 may include a parameter table storing preloaded values, a pseudo-random number generator such as a linear feedback shift register, and/or a counter (e.g., that counts the number of input data elements). The selectable data sources 202 may also include a programmable constant value, a zero value, a floating-point one value, an integer one value, a value representing positive infinity, and/or a value representing negative infinity, etc. In some implementations, the selectable data sources 202 may also include a power of two value (e.g., 8, 16, 24, etc.) which can be used for shifting or masking operations, and/or a bit mask value for masking one or more bytes (e.g., 0xff, 0xff00, 0xff0000 0xff000000, 0xffff, 0xffff0000, 0xffffff00, 0xffffffff, etc.). Each of the multiplexors in the input circuit 204 can independently select the same or different data source to provide to the first computational circuit block 210-1.

At the end of the ALU pipeline, the last computational circuit block 210-N can be coupled to an output circuit 206. The output circuit 206 is operable to select between a primary output of the last computational circuit block 210-N and respective outputs of the bypass circuits of the last computation circuit block 210-N to provide as any of data outputs 208 to write to memory. In some implementations, output circuit 206 can be coupled to a memory write interface circuit, and data outputs 208 can be provided to virtual output ports of the memory write interface circuit. The memory write interface circuit can select data from one or more of the virtual output ports to write to memory. In some implementations the memory write interface circuit can be controlled to write output data to memory under certain prescribed conditions. For example, the compute channel can be configured to write output data to memory only when a predicate condition programmed in an ALU stage is met (e.g., the first numeric input of the designated ALU stage is equal to the second numeric input), or when a tensor subdimension overflows (e.g., write the data output to memory after every M number of data elements for a pooling operation, etc.).

Figure 3:
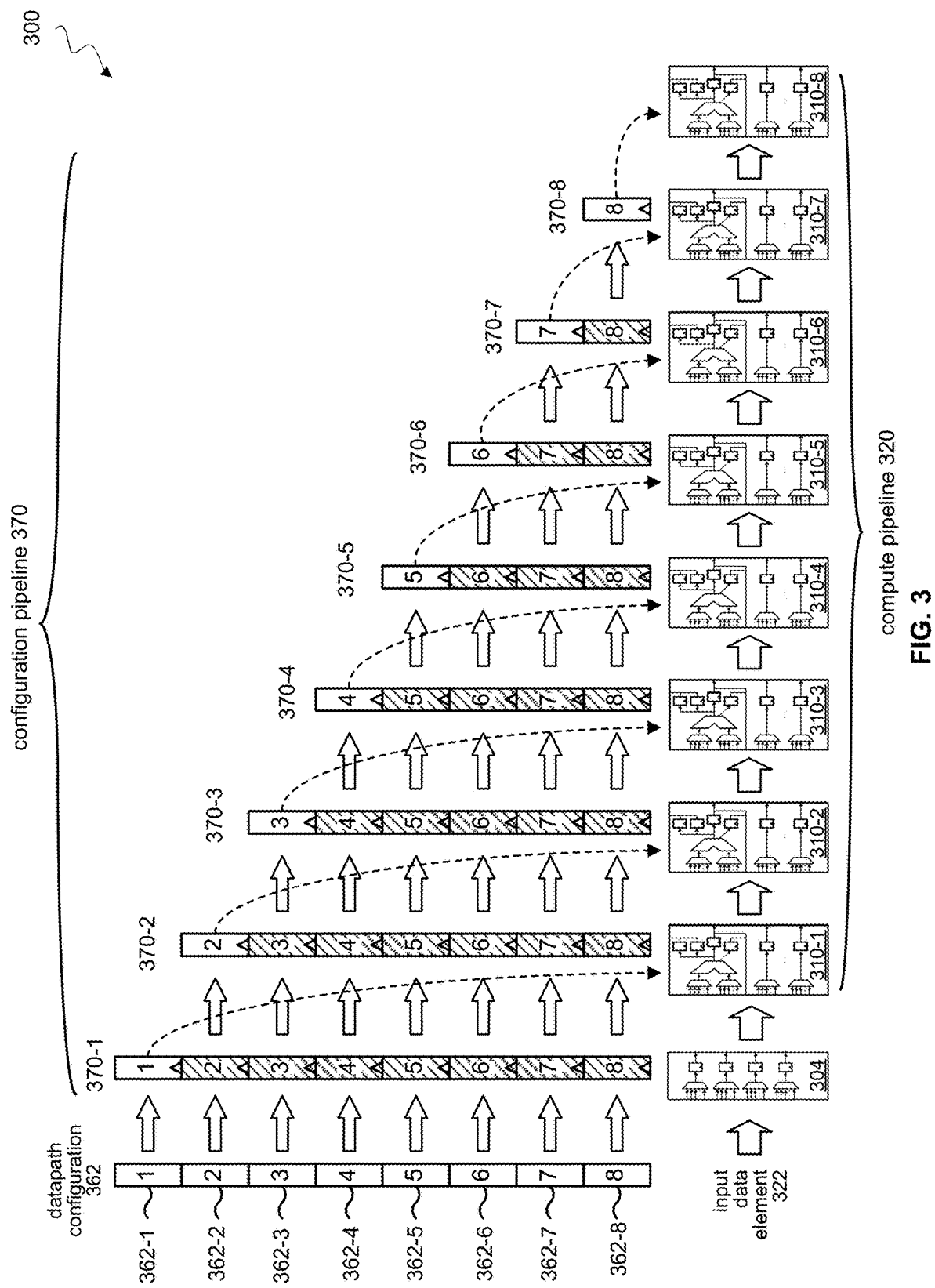
FIG. 3 illustrates a conceptual diagram of an example of configuring a compute channel.

FIG. 3 illustrates a conceptual diagram of an example of configuring the computational circuit blocks of a compute channel 300. In the example shown in FIG. 3, compute channel 300 include eight computational circuit blocks 310-1 to 310-8 coupled in series to form a compute pipeline 320. Each of the computational circuit blocks 310-1 to 310-8 can be implemented, for example, using computational circuit block 100, and represents one compute stage of compute pipeline. In addition to compute pipeline 320, compute channel 300 also includes a configuration pipeline 370 having the same number of stages as the number of compute stages of compute pipeline 320. Hence, in this example, given that the compute pipeline 320 has eight compute stages 310-1 to 310-8, the configuration pipeline 370 also have eight stages 370-1 to 370-8.

Each of the stages 3701- to 370-8 of the configuration pipeline 370 includes a datapath configuration register (e.g., a multibit flipflop) that gets progressively smaller at each pipeline stage. The datapath configuration registers are coupled in series to form a delay chain. The initial datapath configuration register 370-1 is wide enough to store the configuration for each of the computational circuit blocks in the compute pipeline. Hence, in this example, datapath configuration register 370-1 can store eight computation circuit block configurations. As explained further below, the datapath configuration register becomes progressively smaller at each pipeline stage because one of the computational circuit block configurations is consumed at each compute stage, and is not needed for the subsequent compute stages. Collectively, a compute stage of the compute pipeline 320 and a datapath configuration register of the configuration pipeline 370 may at times be referred to as a pipeline stage of the compute channel 300.

During operation, a datapath configuration 362 is inputted into the compute channel 300 in parallel with an input data element 322 of the input tensor, and the datapath configuration 362 is shifted along the configuration pipeline 370 in synchrony with processing of the input data element 322 along the compute pipeline 320. The datapath configuration 362 initially includes a computational circuit block configuration for each of the compute stages of the compute pipeline 320. Hence, datapath configuration 362 includes a computation circuit block configuration 362-1 for compute stage 310-1, a computation circuit block configuration 362-2 for compute stage 310-2, a computation circuit block configuration 362-3 for compute stage 310-3, and so on. All eight computation circuit block configurations 362-1 to 362-8 are inputted into the configuration pipeline 370 in synchrony with input data element 322. The datapath configuration 362 will follow processing of the input data element 322 down the pipeline, and the datapath configuration 362 will become progressively smaller at each stage of the pipeline as each compute stage processes the input data element 322 by operating on the output from the previous compute stage.

Each computational circuit block is configured according to a corresponding computational circuit block configuration in the datapath configuration 362 provided by the corresponding stage of the configuration pipeline 370 in each clock cycle. Referring to FIG. 3, at the first clock cycle, compute channel 300 receives input data element 322 at input circuit 304 and datapath configuration 362 at datapath configuration register 370-1. At the next clock cycle, compute stage 310-1 receives the input data element and is configured using the computation circuit block configuration 362-1 of datapath configuration 362 provided by datapath configuration register 370-1. The other computational circuit block configurations shown with the diagonal fill pattern are ignored by compute stage 310-1. The computational circuit block configuration may include an arithmetic logic unit (ALU) operation (e.g., for ALU 150), an input select for each input multiplexor of the computational circuit block (e.g., multiplexor 112, 114, 162-1 to 162-$n$), and a register enable for each register of the computational circuit block (e.g., register 172, 174, 182, 184, 164-1 to 164-$n$). Compute stage 310-1 then performs a compute operation on input data element 322 based on the computational circuit block configuration 362-1.

At the following clock cycle, compute stage 310-2 receives the output from compute stage 310-1, and is configured using the computation circuit block configuration 362-2 provided by datapath configuration register 370-2. The other computational circuit block configurations provided by datapath configuration register 370-2 shown with the diagonal fill pattern are ignored by compute stage 310-2. Compute stage 310-2 then performs a compute operation for input data element 322 by operating on the output of compute stage 310-1 based on the computational circuit block configuration 362-2. As shown in FIG. 3, datapath configuration register 370-2 can be implemented using a smaller register than datapath configuration register 370-1 because the computation circuit block configuration 362-1 for compute stage 310-1 is not needed by the subsequent compute stages of the pipeline.

A similar process is performed at each pipeline stage of compute channel 300. Hence, at each compute stage of the compute pipeline 320, a computational circuit block configuration corresponding to the compute stage from the datapath configuration 362 provided by the configuration pipeline 370 is selected for configuring or programming that compute stage. A compute operation is then performed on the output from the previous compute stage for the input data element based on the computational circuit block configuration selected for that compute stage. Because a computational circuit block configuration is consumed at each compute stage and is not used in subsequent compute stages, the datapath configuration registers in configuration pipeline 370 can be possessively reduced by the size of computational circuit block configuration at each pipeline stage.

By having the datapath configuration containing the computational circuit block configurations for the compute stages traverse down the pipeline with processing of the input data element, complex computations that apply different operations on sequential input data elements can be performed at high throughput. For example, immediately following input data element 322 can be another input data element that is sent down the pipeline with a different datapath configuration. This eliminates the need to use extra cycles to reconfigure the computational circuit blocks, because the computational circuit block configurations are provided together with the input data element down the pipeline. Each datapath configuration may correspond to a microoperation. Hence, complex computations can be performed by issuing a sequence of microoperations to compute channel 300.

Figure 4:
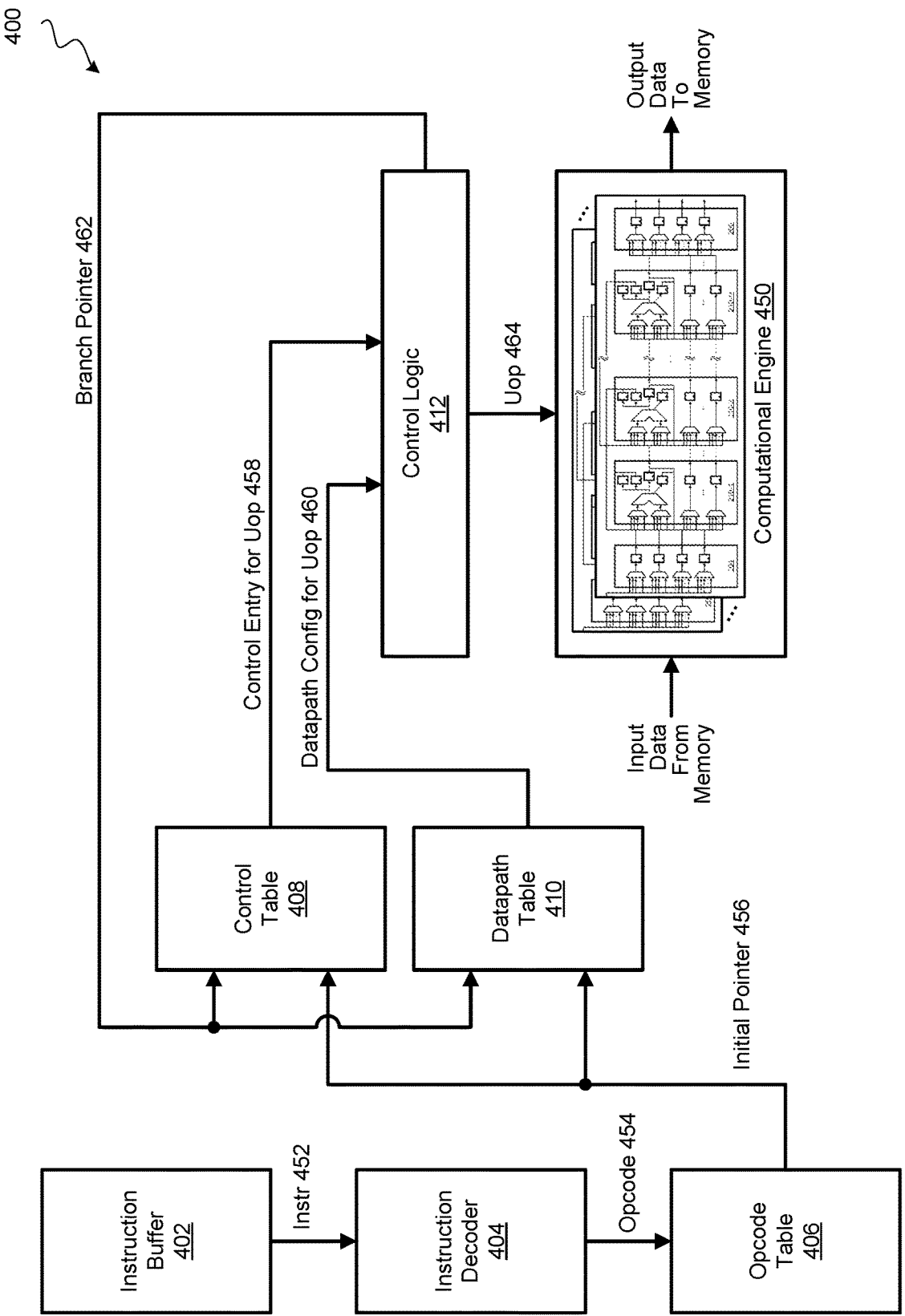
FIG. 4 illustrates a block diagram of an example of an execution engine.

FIG. 4 illustrates a block diagram of an example of an execution engine 400. Execution engine 400 can be part of a data processor (e.g., a data processing integrated circuit device such as a processor, a graphics processor, a digital signal processor, a tensor processor, a neural network accelerator, or other types of application specific integrated circuits). Execution engine 400 can include a computational engine 450 having multiple compute channels, and may provide a programming interface for compute engine 450. In some implementations, computational engine 450 can be, for example, a vector compute engine.

Computational engine 450 can include multiple compute channels to perform parallel data processing. Each of the compute channel can be implemented as a processing circuit with multiple computational circuit blocks coupled in series to form a pipeline. For example, in some implementations, a compute channel can be implemented using compute channel 300, and may include at least eight computational circuit blocks, and thus at least eight pipeline stages. Each of the computation circuit blocks includes a programmable ALU circuit that can be programmed to perform various functions depending on the machine instruction being executed by execution engine 400. Each compute channel can also be coupled to a memory read interface circuit and a memory write interface circuit to interface with memory accessed by computational engine 450. The memory accessed by computational engine 450 may include, for example, a state buffer memory and/or a results buffer memory. When reading input data and writing output data, computational engine 450 may read and write the state buffer memory, read and write the results buffer memory, read the state buffer memory and write to the results buffer memory, or vice versa. Hence, the term memory need not necessarily refer to a specific buffer or memory device, and may refer to one or more memory components accessible by computational engine 450 collectively.

Execution engine 400 may include an instruction buffer 402, an instruction decoder 404, an opcode table 406, a control table 408, and a datapath tale 410 to facilitate programming of computational engine 450. Instruction buffer 402 stores a set of pending machine instructions that are executable by execution engine 400 to perform certain functions or operations. Instruction buffer 402 may include a set of entries in which each entry stores a single machine instruction. The machine instructions can be, for example, assembly-type instructions and can be part of an instruction set for the data processor architecture. Examples of instruction sets may include ARM instruction set, MIPS instruction set, x86 instruction set, or other types of proprietary instruction set tailored for a certain data processor architecture.

Instruction decoder 404 is configured to retrieve or obtain a machine instruction from instruction buffer 402, and includes instruction decoder circuitry to decode the machine instruction to determine the actions to be taken by execution engine 400. For example, instruction decoder 404 may decode a machine instruction to extract various fields including an opcode, and one or more operands or values (depending on the opcode) to allow execution engine 400 to perform the intended operations. In some implementations, instruction decoder 404 may decode a complex instruction into multiple opcodes and corresponding optional operands. Instruction decoder 404 may also drop or discard unrecognizable or invalid instructions. The fields extracted by instruction decoder 404 can be used to lookup configuration profiles (e.g., sequence of microoperations) to program or configure computational engine 450 to perform certain functions. The extracted fields from the machine instruction may also identify locations in memory to retrieve data for computational engine 450 to process, and identify locations in memory to write the results outputted from computational engine 450.

Opcode table 406 is used for storing opcode entries corresponding to respective opcodes. The opcode decoded from a machine instruction can be used as an index into the opcode table 406 to retrieve the opcode entry corresponding to the machine instruction. In some implementations, opcode entry 406 may include an entry for each possible opcode that can be decoded from the machine instructions of the instruction set supported by execution engine 400. In some implementations, it is also possible for different machine instructions to decode to the same opcode.

Each opcode entry may include an initial pointer that is used as an entry point into control table 408 and datapath table 410. The initial pointer in the opcode entry can be used as an index to access a control entry in control table 408 and a datapath configuration entry in datapath table 410. Collectively, the control entry and the datapath configuration entry indexed by the initial pointer can be used to define an initial microoperation for the machine instruction being executed. Hence, the initial pointer can be thought of as pointing to an initial microoperation for the machine instruction.

Each opcode entry may include other fields that contain settings to enable or use other features of execution engine 400. For example, in some implementations, execution engine 400 may include a parameter table that acts as a data source for computational engine 450. The parameter table can be loaded with values that can be read into a compute channel of computational engine 450. For instance, the value $(1/k)$, with k being the index of a data element of a tensor, is used in computing the mean and variance of the data elements of the tensor. Instead of computing $(1/k)$ using a compute stage in the compute channel, a series of $(1/k)$ values (e.g., 1, 1/2, 1/3, 1/4, 1/5, etc.) can be preloaded into the parameter table, and the values can be read from the parameter table into the compute channel when needed. The opcode entry corresponding to an opcode may include a load parameter table setting bit, which if asserted, will load the parameter table with values provided with the machine instruction.

In some implementations, execution engine 400 may include one or more data rearrangement circuits that performs data rearrangement of an input tensor before inputting the input tensor from memory into the compute channels of computational engine 450. For example, the data rearrangement circuit can be used to transpose a tensor or shuffle the data elements of a tensor before inputting the data elements into the compute channels of computational engine 450. In such implementations, the opcode entry may include a data rearrangement mode field to indicate an operating mode to configure the data rearrangement circuit. For instance, the data rearrangement circuit can operate in a transpose mode, a data shuffle mode, or a bypass mode in which no rearrangement of the data elements is performed. For the data shuffle mode, the opcode entry may include a data mask enable setting to load a data mask provided in the machine instruction to control the output selection of each output lane of the data rearrangement circuit.

Datapath table 410 is used to store datapath configuration entries corresponding to respective microoperations. As described above, each datapath configuration includes multiple computational circuit block configurations to configure the respective computational circuit blocks in the pipeline of a compute channel. Each computational circuit block configuration may include an arithmetic logic unit (ALU) operation, an input select for each input multiplexor of the computational circuit block, and a register enable for each register of the computational circuit block.

Control table 408 is used to store control entries corresponding to respective microoperations. Each control entry includes control flow information for branching to a next microoperation. Each control entry may also include other fields that contain control information for the compute channels of computational engine 450. The control flow information of a control entry may contain a branch trigger setting that includes a branch condition and a next microoperation to branch to when the branch condition is satisfied. In some implementations, the control flow information of a control entry may include multiple branch trigger settings in the control flow information of the control entry, and each branch trigger setting may include a branch condition and the next microoperation to branch to if that branch condition is satisfied. The multiple branch trigger settings can be prioritized in a priority order such that if two or more branch conditions are satisfied at the same time, the execution flow will branch to next microoperation specified by the highest priority branch trigger setting having a satisfied branch condition. In some implementations, each control entry may include at least three prioritized branch trigger settings, though not every branch trigger setting needs to be used. The next microoperation indicated in a branch trigger setting can have a default value of branching to a no operation (nop) microoperation, which disables the inputs and the registers in the compute channel.

The branch condition can have a default setting of staying in the current microoperation such that the current microoperation is continuously issued to a compute channel. The branch condition can also be configured to branch to the next microoperation indicated in the control entry when a counter value reaches a repeat count. In other words, the current microoperation will repeat for a number of times before branching to the next microoperation indicated in the control entry of the current microoperation. The repeat count itself can be a programmable field in the control entry of the current microoperation. The branch condition can also be configured to branch to the next microoperation upon receiving a new machine instruction, when the compute channel has completed processing of an input tensor specified in the machine instruction (e.g., finished inputting a certain number of input data elements corresponding to the size of the input tensor), or when the compute channel has completed generating an output tensor specified in the machine instruction (e.g., finished outputting a certain number of output data elements corresponding to the size of the output tensor). In some implementations, the branch condition can also be configured to branch to the next microoperation when a subdimension of an input tensor being serially inputted into the compute channel rolls over. This can be useful, for example, when performing a down-sampling or a pooling operation on an input tensor, in which certain operations are performed over a window or filter size of data elements.

The control entry for a microoperation can also include one or more wait enable setting bits to enable waiting until a data element of an input tensor is available from memory before issuing the current microoperation to the compute channel. In some scenarios, the memory storing the input tensor or the datapath from the memory can be congested. The wait enable can ensure that the current microoperation is issued to the compute channel at the same time as a valid input data element. When the wait enable bit is set, a nop (no operation) can be issued to the compute channel while waiting for the data element of the input tensor to become available. For computations that operate on two input tensors (e.g., combining the data elements of a first input tensor with the data elements of a second input tensor), an additional wait enable setting bit can be used to enable waiting until a data element of the second input tensor is available from memory before issuing the current microoperation to the compute channel. The wait enable settings can be independently configured to provide additional flexibility on controlling when the microoperation is issued to the compute channel.

As mentioned above, in addition to the control flow information for branching to the next microoperation, each control entry may include additional configuration information or settings for a compute channel. The control information may include settings to control when the outputs of a compute channel are written to memory. For example, the control information may include a write enable setting bit to enable writing of an output of the compute channel to memory, and an output selection setting to select which of the outputs of the last computational circuit block of the pipeline to output from the compute channel. When writing the output of the compute channel (e.g., an output tensor) to memory is enabled, the current microoperation is not issued to the compute channel until the memory location allocated for the output of the compute channel is available for writing. A nop (no operation) can be issued to the compute channel while waiting for the memory location. The control information may include a write predicate setting bit to disable writing an output to memory when a predicate condition is not met, and a write predicate selection setting to select which of the computation circuit blocks in the pipeline is used to implement the predicate condition. The control information may also include a tensor subdimension write enable setting bit to enable selectively writing an output of the compute channel to memory when a subdimension of an input tensor being inputted into the compute channel rolls over (e.g., for down-sampling or pooling operations).

Other control information provided in a control entry may include a data source selection and an input enable setting for each of the multiple data inputs provided to a compute channel. The possible data sources to select from for a compute channel may include any of the data sources 202 described above, and may include a source input tensor from memory. For certain operations, the data sources may include a second source input tensor from memory (e.g., when combining the data elements of two input tensors). The data sources may also include values being read from a parameter table as described above. If the parameter table is used, the control information of a control entry may include a parameter index increment setting bit to increment an index into the parameter table at each clock cycle. When this bit is set, a sequence of values stored in the parameter table can be read into the compute channel. The control information may also include a reversal setting bit, which when set, reverses the two inputs to the arithmetic logic unit (ALU) of a computational circuit block. This feature can be used, for example, to reverse the polarity of a subtraction operation such as when performing a tensor scalar operation.

In some implementations, the execution engine 400 may include match logic to replace an input data element with a replacement value when the input data element matches a comparison value. The match and replace logic can be used to perform sorting operations, or to find a set of one or more maximum values or a set of one or more minimum values in an input data set. The control information of a control entry may include a match enable setting bit to enable the match logic. The control information can further include a match mask setting to select which of the computational circuit blocks in the pipeline that the match enable setting applies to. To facilitate sorting operations, the control information may include an index counter enable setting bit to enable an index counter to count input data elements, and a counter reset setting bit to reset the index counter. The index counter can be used to track the location of a particular input data element.

Referring back to FIG. 4, when instruction decoder 404 receives a machine instruction 452 to perform a computation on an input tensor to generate an output tensor, the machine instruction 452 is decoded to obtain an opcode 454. Opcode 454 derived from the machine instruction is used to access the opcode table 406 to obtain an initial pointer 456 that points to an initial microoperation of the machine instruction. The initial pointer 456 is used to access a control entry in the control table 408 to obtain control flow information and other control information for the initial microoperation, and to access a datapath configuration entry in the datapath table 410 to obtain a datapath configuration for the initial microoperation. It should be noted that in some implementations, different opcodes may point to the same initial microoperation.

The control entry 458 and the datapath configuration 460 representing the initial microoperation are provided to control logic 412. Control logic 412 processes the control entry and issues the initial microoperation to the compute channels of computational engine 450 by configuring the compute channels with the control information in the control entry 458 and the datapath configuration 460 for the initial microoperation. Control logic 412 may wait for the input data to be available before issue the microoperation (e.g., if the control entry has the wait enable bit set), and control logic 412 may control how the output data is written to memory based on the control entry 458.

Upon issuing the initial microoperation 464, control logic 412 may continue issuing the initial microoperation to the compute channel at each clock cycle until a branch condition in the initial microoperation is satisfied. At some point, the control logic may determine that the branch condition in the initial microoperation is satisfied, and identify the next microoperation associated with the satisfied branch condition. For example, the branch trigger setting in the control entry for initial microoperation may contain a value representing the next microoperation to branch to, and that value can be used as a branch pointer 462. Control logic 412 can use the branch pointer 462 to access a control entry in the control table 408 to obtain a control entry including control flow information for the next microoperation, and access a datapath configuration entry in the datapath table 410 to obtain a datapath configuration for the next microoperation. The control entry and the datapath configuration for the next microoperation on are provided to control logic 412, and control logic 412 may issue the next microoperation to the compute channel by configuring the compute channel with the control entry and the datapath configuration for the next microoperation. The process may continue until all microoperations for the machine instruction has been performed, and then proceed to execute the next machine instruction. If no new machine instruction is available, control logic 412 may issue nops (no operations) to computational engine 450 until the next machine instruction is received.

Figure 5:
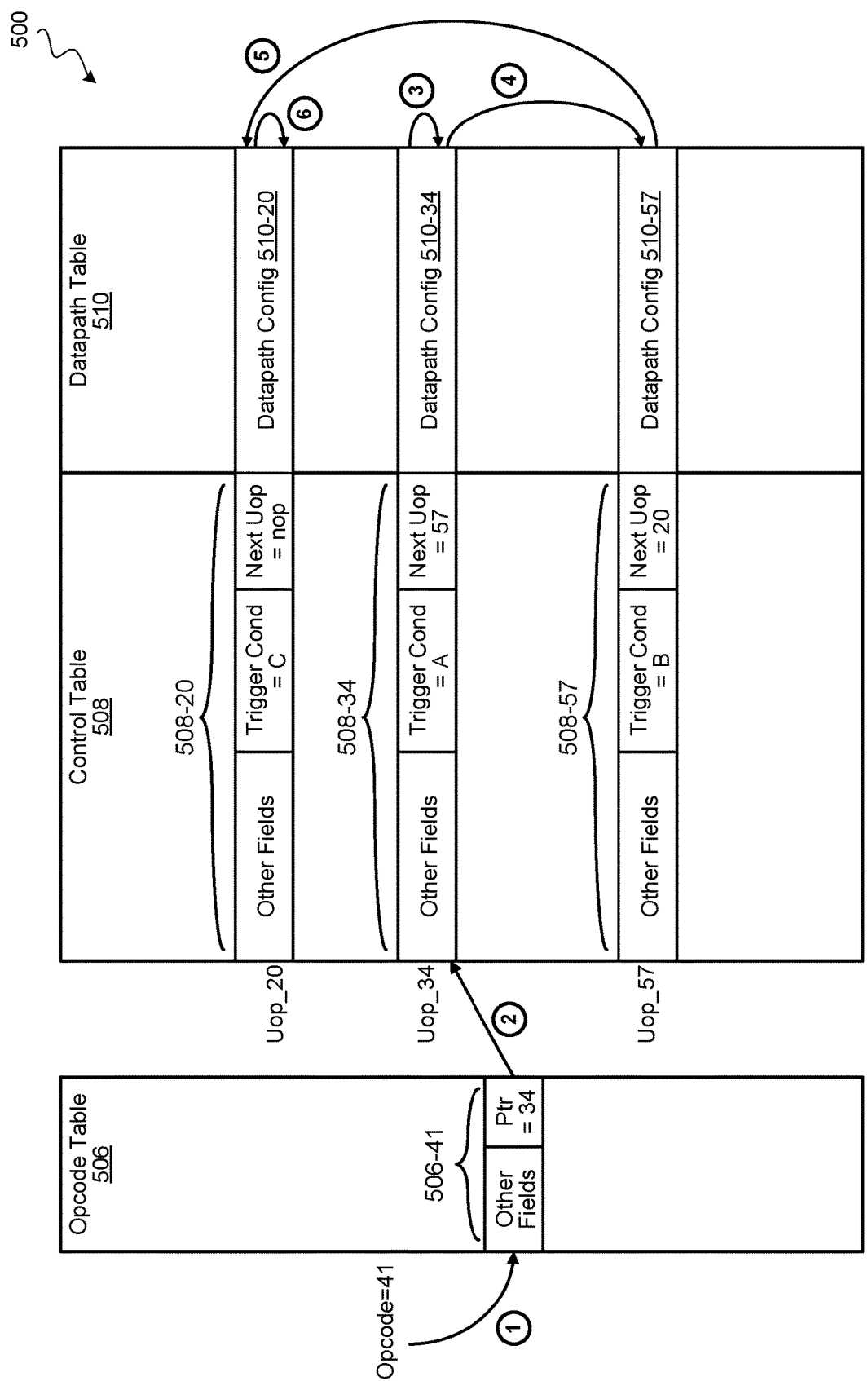
FIG. 5 illustrates a conceptual diagram of an example of a sequence of microoperations.

FIG. 5 illustrates a conceptual diagram 500 of an example of a microoperation sequence. The microoperation sequence can be issued as part of the execution of a machine instruction. Opcode table 506, control table 508, and datapath table 510 can be implemented, for example, using opcode table 406, control table 408, and datapath table 410, respectively.

At operation ①, an opcode decoded from a machine instruction is used as an index to access opcode table 506 to obtain opcode entry 506-41. Opcode entry 506-41 may include a pointer value representing microoperation 34 (uop_34). Opcode entry 506-41 may include other fields, such as settings to configure a data rearrangement circuit and/or to load a parameter table. At operation ②, the pointer in opcode entry 506-41 is used to access uop_34 represented by the corresponding control entry 508-34 in control table 508, and the corresponding datapath configuration entry 510-34 in datapath table 510. Control entry 508-34 may include a branch trigger setting containing a trigger condition A and a next microoperation of uop_57.

At operation ③, uop_34 can be issued with datapath configuration 510-34 to a compute channel at each clock cycle until trigger condition A is satisfied. For example, trigger condition A can be configured to repeat the uop_34 for a certain number of clock cycles. When trigger condition A is satisfied, the execution flow branches to uop_57 at operation ④. The control entry 508-57 corresponding to uop_57 may include a branch trigger setting containing a trigger condition B and a next microoperation of uop_20. The trigger condition B can be configured to issue the uop_57 one time by setting the repeat count to one. Hence, after issuing uop_57 with datapath configuration 510-57 to the compute channel once, the execution flow branches to uop_20 at operation ⑤.

The control entry 508-20 corresponding to uop_20 may include a branch trigger setting containing a trigger condition C and a next microoperation pointing to a nop (no operation). In some implementations, the first entry in control table 508 and datapath table 510 can be used for the nop microoperation. The trigger condition C for uop_20 can be configured to issue the uop_20 until all data elements of the input tensor has been processed. At operation ⑥, uop_20 can be issued at each clock cycle with datapath configuration 510-20 to the compute channel until the input tensor has finished streaming into the compute channel. At that point, the execution flow may return to nop until a new machine instruction is received.

It should be noted that the opcode table, control table, and datapath table can be implemented using one or more programmable memories, and that each table can be reprogrammed to allow different microoperation sequences to be implemented. The sizes of the tables can also vary. In some implementations, the control table and the datapath table can have the same number of entries because a microoperation is represented collectively by the combination of a control entry and a datapath configuration entry. The number of opcode entries need not be the same as the number of control/datapath configuration entries because multiple opcodes may point to the same initial microoperation. By implementing these tables using programmable memories, new operations can be defined for the compute channel even after tapeout of the integrated circuit device.

Figure 6:
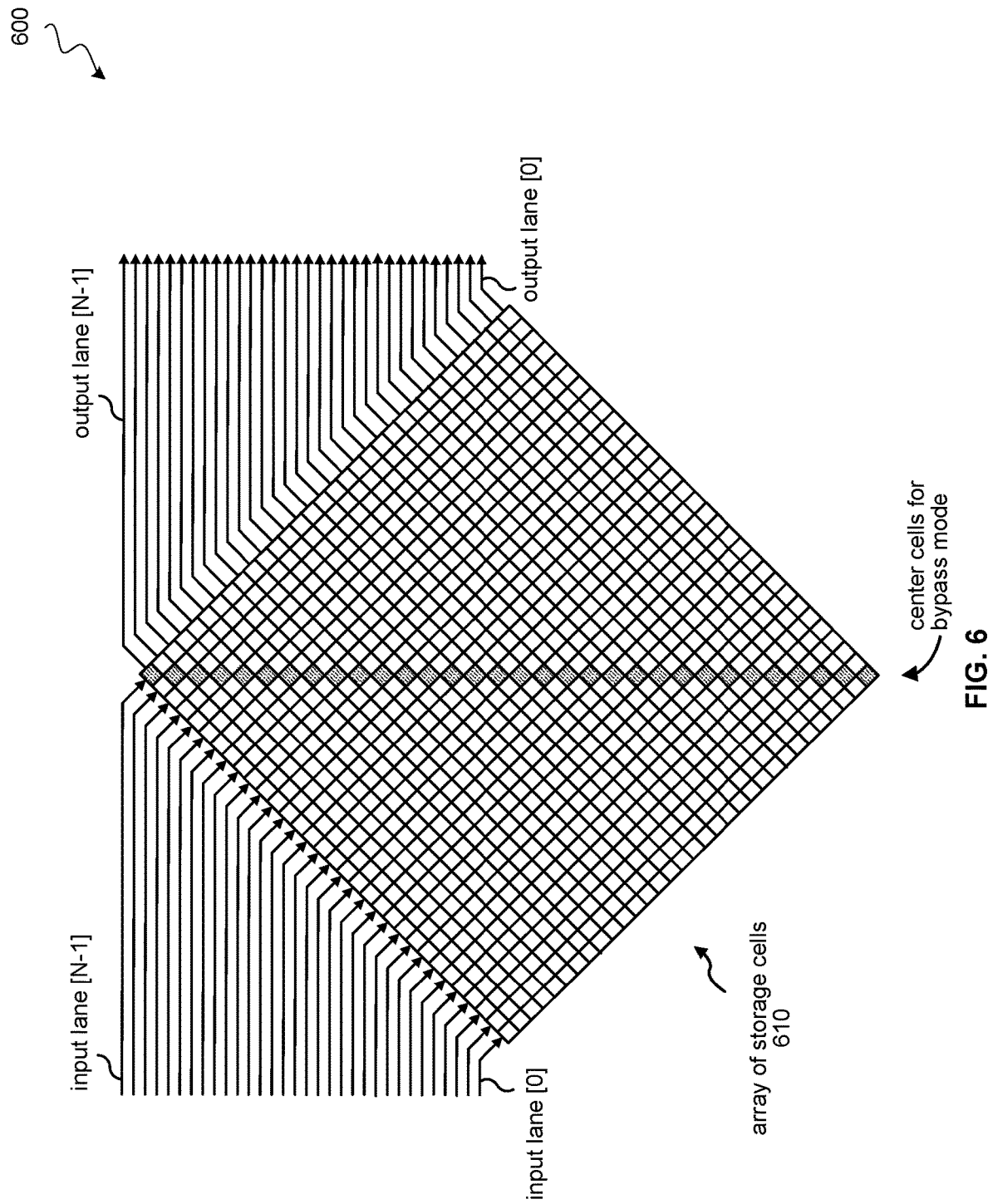
FIG. 6 illustrates a block diagram of an example of a data rearrangement circuit.

As mentioned above, execution engine 400 may include one or more data rearrangement circuits to rearrange the data elements of a tensor before inputting the data elements into the compute channels. FIG. 6 illustrates a block diagram of an example of such a data rearrangement circuit 600. Data rearrangement circuit 600 may include an array of storage cells 610 (may also be referred to as a cell array). The array of storage cells 610 can be a N×N cell array having N number of storage cells across an input side, and N number of storage cells across an output side. The array of storage cells 610 may have N number of input lanes coupled to the N number of storage cells on the input side, and N number of output lanes coupled to the N number of storage cells on the output side. The output lanes are orthogonal to the input lanes. In the example shown, data rearrangement circuit 600 includes a 32×32 cell array having 32 input lanes and 32 output lanes. However, it should be understood that the data rearrangement circuit 600 in other implementations may have other dimensions.

Each cell in array of storage cells 610 is a storage element for storing a data element (e.g., a data element from a tensor). For example, each cell can be a multibit storage element such as a multibit flip-flop. The multibit flipflop can be configured to store, for example, a floating-point numeric value such as a 32-bit floating-point numeric value or other suitable datatypes (e.g., 16-bit floating point, 16-bit brain floating point, integer, etc.).

Data rearrangement circuit 600 may include an input interface that is operable to provide an input data element to each input lane of the array in parallel. Hence, at each clock cycle, input interface may provide N number of data elements in parallel to the N number of input lanes. Each input lane may be associated with an index that is used to identify the lane. For example, the input lanes can be indexed from input lane [0] to input lane [N−1]. Each input lane is operable to write the input data element received on the corresponding input lane to any one or more selected storage elements of the input lane concurrently by selectively enabling the storage element(s) along the input lane.

Data rearrangement circuit 600 may include an output interface that is operable to provide an output data element read from each output lane of the array in parallel. Hence, at each clock cycle, the output interface may provide N number of data elements in parallel from the N number of output lanes. Each output lane may be associated with an index that is used to identify the lane. For example, the output lanes can be indexed from output lane [0] to output lane [N−1], and are indexed in the same order as the input lanes. Each output lane is operable to independently select a storage cell in the output lane to read, and output the corresponding output data element from the selected storage cell by selectively enabling the chosen storage cell.

Data rearrangement circuit 600 may operate in various modes including a transpose mode to transpose an input tensor, a shuffle mode to perform other types of data rearrangement, and a bypass mode to passthrough a tensor without modification. The particular operating mode of data rearrangement circuit 600 for a machine instruction can be specified in the opcode entry corresponding to the machine instruction.

Figure 7:
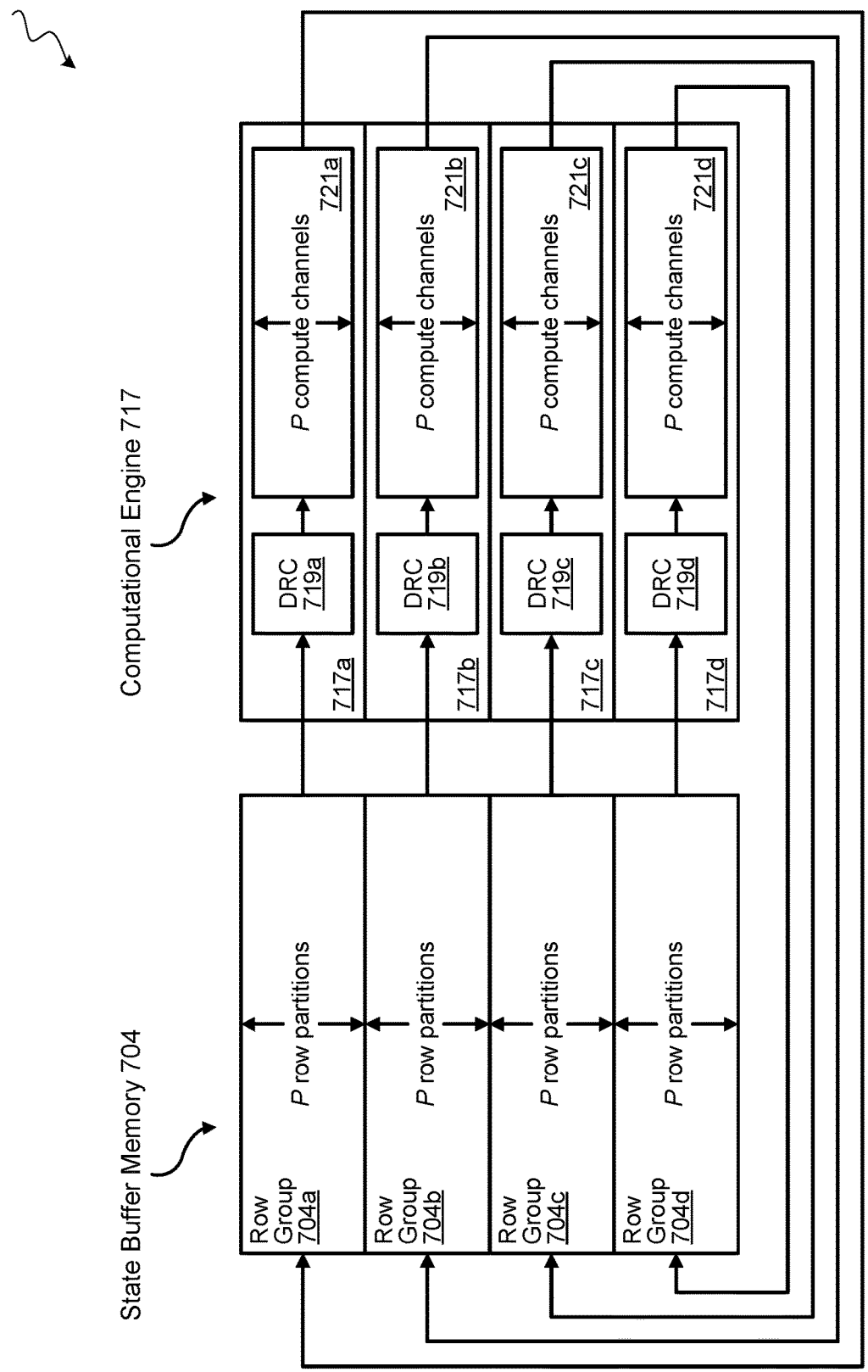
FIG. 7 illustrates a simplified block diagram of an example of an accelerator with a computational engine.

FIG. 7 illustrates a block diagram of an example of a portion of a neural network accelerator 700. Neural network accelerator 700 includes a state buffer memory 704 and a computational engine 717. Computational engine 717 can be, for example, a vector compute engine. Neural network accelerator 700 may include additional components not shown, such as a processing engine (PE) array (e.g., a systolic array) to perform matrix multiplication operations, and a results buffer memory to store the results from the PE array. It should be understood that neural network accelerator 700 may include these components as well as other components not specifically shown. The components of neural network accelerator 700 can be implemented on a single semiconductor die or in a single chip package.

State buffer memory 704 may include multiple row partitions organized into row groups. In the example shown, state buffer memory 704 has four row groups 704a to 704d, and each of the row groups includes P number of row partitions. Hence, if state buffer memory 704 has m=128 row partitions, each row group may have 32 row partitions. Although state buffer memory 704 is shown to have the same number of row partitions per row group, in some implementations, different row groups may include different number of row partitions. Furthermore, state buffer memory 704 may include a different number of row groups.

State buffer memory 704 acts as a cache to store tensors or matrices for a PE array (not shown) to process. The data stored in state buffer memory 704 can include input data, feature maps, weight tensors, intermediate results of in-progress computations, etc. The PE array can load matrices from the row partitions of state buffer memory 704 and perform matrix multiplication computations on the matrices. In some implementations, the PE array can support tiling to perform independent matrix multiplications on matrices obtained from different row groups. The results of the matrix multiplication computations can be stored and accumulated in a result buffer memory (not shown). The accumulated results can be written back to state buffer memory 704 for subsequent processing.

Computational engine 717 may include multiple compute banks 717a to 717d coupled to respective row groups 704a to 704d of state buffer memory 704. Hence, each compute bank processes data from a corresponding row group. As shown in FIG. 7, the output of each compute bank can be written back to the corresponding row group of state buffer memory 704. Each of the compute banks 717a to 717d can be configured independently from each other to process data from their respective row groups 704a to 704d. Compute banks 717a to 717d (or a subset thereof) may also operate collectively to process data from a tensor that spans multiple row groups. It should be noted that although not shown in FIG. 7, computational engine 717 can also process data inputted from the results buffer memory.

Each compute bank includes a data rearrangement circuit (DRC) and multiple compute channels coupled to the DRC. For example, compute bank 717a includes a DRC 719a coupled to a set of compute channels 721a, compute bank 717b includes a DRC 719b coupled to a set of compute channels 721b, and so on. Each compute bank may contain the same number of compute channels as the number of row partitions in the corresponding row group. Hence, if there are P number of row partitions in a row group, the corresponding compute bank may have P number of compute channels. The output of each compute channel can be written back to a corresponding row partition.

Referring to compute bank 717a, DRC 719a can transpose submatrices (e.g., matrices spanning up to P row partitions) obtained from row group 704a, and provide the transposed submatrices to compute channels 721a. Each submatrix provided to DRC 719a can be considered an input tensor for DRC 719a. Hence, DRC 719a is operable to receive an input tensor, transpose the input tensor, and output the transposed tensor to compute channels 721a. DRC 719a may include a shuffle mode of operation in which the data elements of the input tensor are rearranged in a different manner before being provided to compute channels 721a. DRC 719a may also include a bypass mode of operation in which the input tensor is provided to compute channels 721a as is, without rearranging the data elements.

Each compute channel in compute channels 721a can operate in parallel and can perform computations to generate outputs in parallel. Each of the parallel outputs generated by compute channels 721a can be generated from a corresponding vector of the tensor (e.g., transposed tensor) inputted into compute bank 717a. In some implementations, the output generated from a compute channel can be an output vector generated by applying an elementwise operation to each element of the vector of the tensor (e.g., transposed tensor) inputted into the compute channel. In other words, when a tensor of T elements is streamed into a compute channel, the compute channel may output T' number of elements processed by the compute engine. Such operation can be used, for example, to scale and/or apply an offset to each of the data elements streamed into the compute engine. The output of a compute channel can also be an output value generated by performing one or more computations on the elements of the tensor (e.g., transposed tensor) inputted into the compute channel. For example, the output value can be the mean computed over the elements streamed into the compute channel, and/or the variance computed over the elements streamed into the compute channel.

In some implementations, because the compute channels of each compute bank are coupled to one DRC and the DRC is configured by a field in the opcode entry, the compute channels within a compute bank can be configured together to execute the same set of microoperations when processing an input tensor. By having multiple compute banks, different compute banks can be configured independently to perform different sequences of microoperations, and thus different compute banks can perform independent operations.

Figure 8:
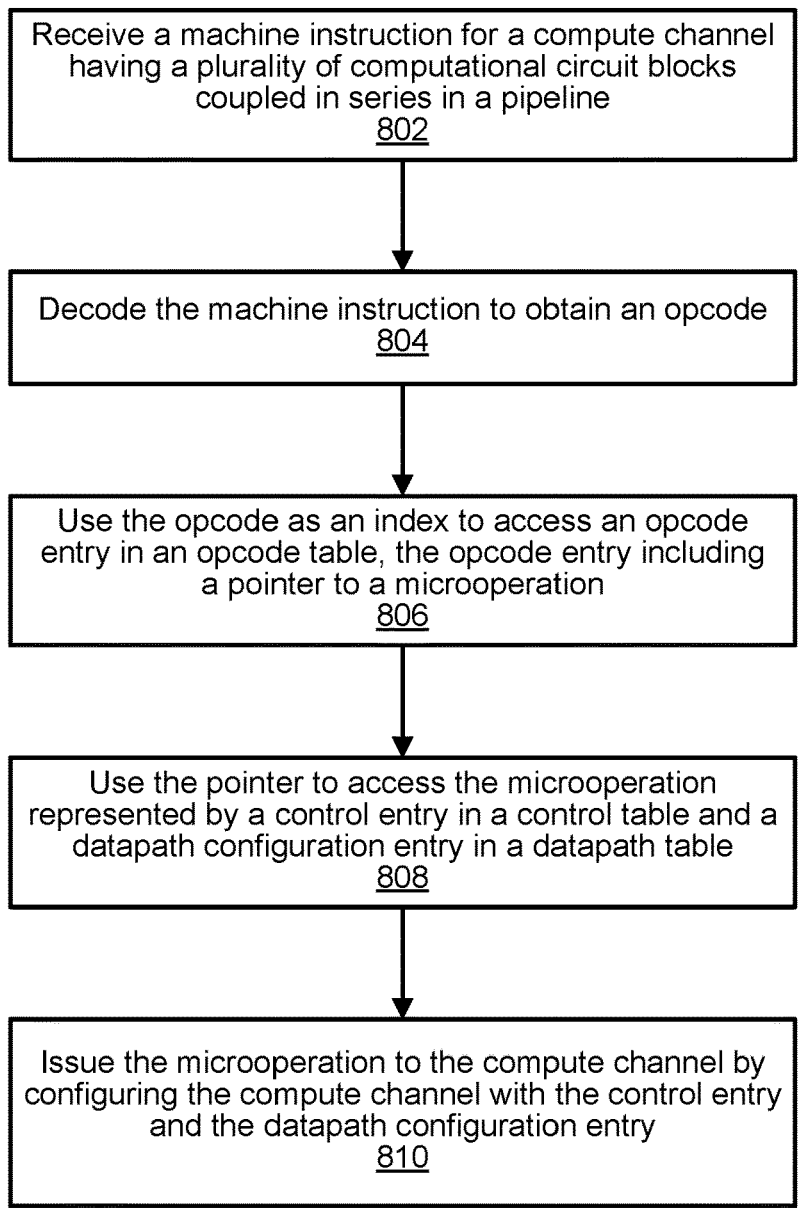
FIG. 8 illustrates a flow diagram of an example of a process for operating a compute channel.

FIG. 8 illustrates a flow diagram of an example of a process 800 for operating a compute channel of an integrated circuit device. The compute channel may include multiple computational circuit blocks coupled in series in a pipeline, and is operable to perform programmable computations on input data elements of a tensor being serially inputted into the pipeline. The compute channel can execute a microoperation in each cycle. In some implementations, the compute channel may include eight computational circuit blocks, and thus eight microoperations can be inflight at the same time in the compute channel, with each compute stage executing a microoperation.

At block 802, process 800 may receive a machine instruction for the compute channel. The machine instruction may request the compute channel to perform certain computations on an input tensor. The machine instruction may include various input values, and may include source memory address information to read input data from and destination memory address information to write output data to. The machine instruction can be part of an instruction set supported by the compute channel.

At block 804, an opcode is decoded from the machine instruction. In some implementations, the opcode may appear in a designated field in the machine instruction, and the machine instruction can be parsed to extract the opcode. In some implementations, the opcode can be derived from one or more fields in the machine instruction, for example, by applying certain arithmetic or logic operations to certain field or fields in the machine instruction.

At block 806, the opcode obtained at block 804 can be used as an index to access an opcode entry in an opcode table. The opcode entry may include a pointer to a microoperation. The microoperation can be an initial microoperation or an entry point into a sequence of microoperations that is used to implement the machine instruction. The pointer in the opcode entry can be a microoperation identifier or other reference (e.g., table address or index) that can be used to access the microoperation represented by control information and datapath configuration. In some implementations, the opcode entry may include other fields such as settings to load a parameter table or to configure a data rearrangement circuit.

At block 808, the pointer in the opcode entry can be used to access the microoperation represented by a control entry in a control table and a datapath configuration entry in a datapath table. The control entry may include control flow information containing a branch trigger setting having a branch condition and the next microoperation to branch to when the branch condition is satisfied. The branch trigger setting can be one of multiple prioritized branch trigger settings in the control flow information of the control entry. The branch condition can have a default setting of continuously issuing the microoperation. In some implementations, the branch condition can be configurable to be any of branching to the next microoperation when on a counter value reaches a repeat count, upon receiving a new machine instruction, when a subdimension of an input tensor being serially inputted into the compute channel rolls over, when the compute channel has completed processing of an input tensor specified in the machine instruction, or when the compute channel has completed generating an output tensor specified in the machine instruction.

At block 810, the microoperation can be issued to the compute channel by configuring the compute channel with information from the control entry and the datapath configuration entry. The microoperation can be issued to the compute channel (e.g., at each clock cycle) until a branch condition of the microoperation is satisfied. In some implementations, issuance of the microoperation can wait until a data element of the input tensor is available from memory. A nop (no operation) can be issued to the compute channel while waiting for the data element of the input tensor to become available. For computations that operates concurrently on two input tensors, issuance of the microoperation can also wait until a data element of the second input tensor is available from memory. When the branch condition of the microoperation is determined to be satisfied, the next microoperation associated with the satisfied branch condition can be issued to the compute channel.

Figure 9:
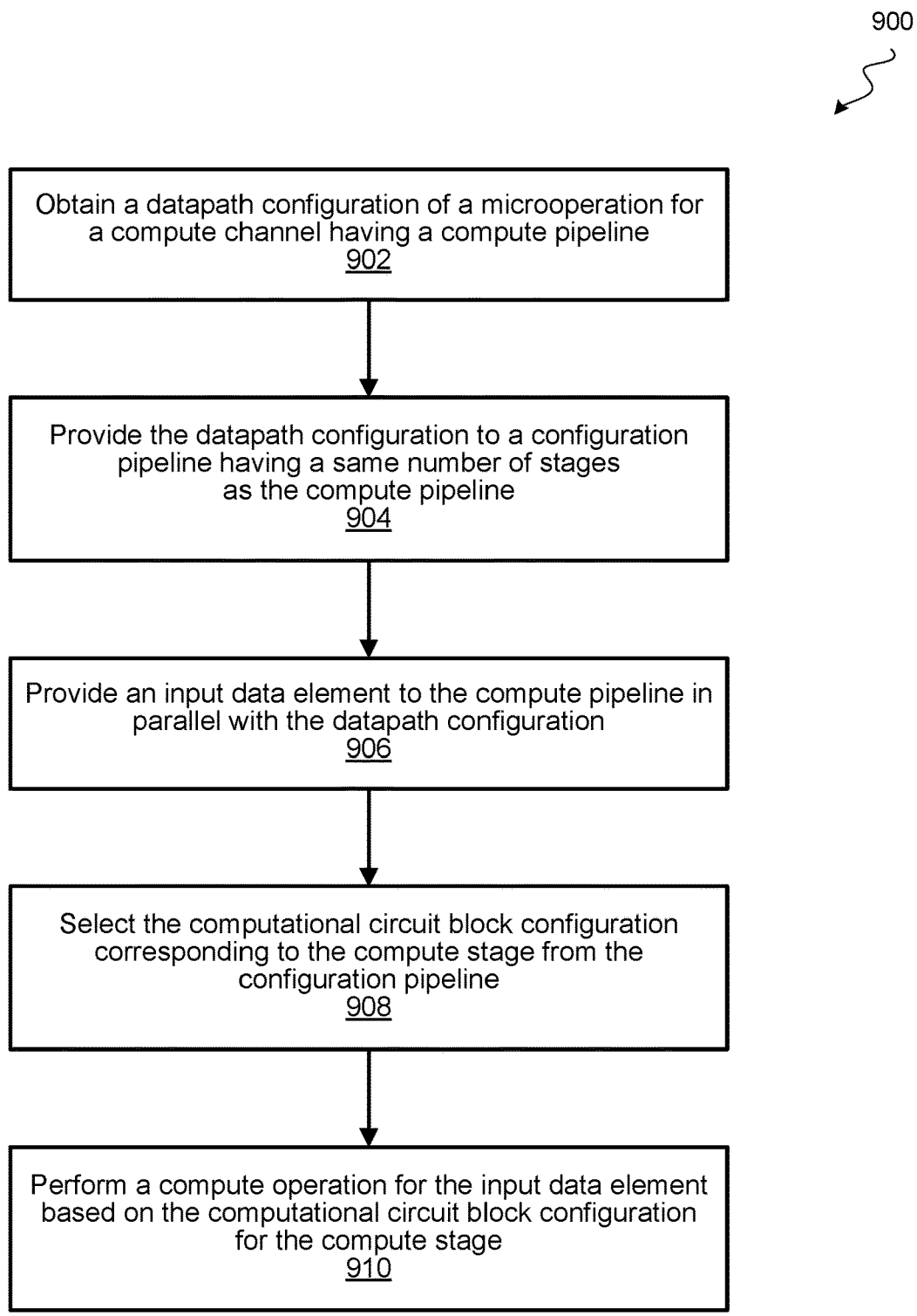
FIG. 9 illustrates a flow diagram of an example of a process for configuring the datapath of a compute channel.

FIG. 9 illustrates a flow diagram of an example of a process 900 for configuring the datapath of a compute channel of an integrated circuit device. The compute channel may include multiple computational circuit blocks coupled in series to form a compute pipeline of compute stages, and a configuration pipeline having the same number of stages as the compute pipeline. The configuration pipeline can be implemented using a set of configuration registers coupled in series to form a configuration delay chain.

At block 902, process 900 may obtain a datapath configuration of a microoperation for the compute channel. The datapath configuration includes a computational circuit block configuration for each of the compute stages in the compute pipeline. The datapath configuration can be obtained, for example, for looking up an entry corresponding to the microoperation in a datapath table. Each of the computational circuit block configurations included in the datapath configuration may include an arithmetic logic unit (ALU) operation, an input select for each input multiplexor of the computational circuit block, and a register enable for each register of the computational circuit block.

At block 904, the datapath configuration is provided to the configuration pipeline of the compute channel, and at block 906, an input data element is provided to the compute pipeline in parallel with the datapath configuration. The datapath configuration containing progressively one fewer computational circuit block configuration can traverse down the pipeline in synchrony with processing of the input data element. The datapath configuration of the microoperation can be provided to the configuration pipeline with a new input data element in each clock cycle until a branch condition of the microoperation is satisfied.

At block 908, at each compute stage of the compute pipeline, the computational circuit block configuration corresponding to that compute stage is selected from the datapath configuration. Furthermore, the computational circuit block configuration consumed at each compute stage can be removed from the configuration pipeline because that computational circuit block configuration is not used by subsequent compute stages. At block 910, a compute operation is performed for the input data element at the compute stage based on the computational circuit block configuration for that compute stage. At some point, the branch condition of the microoperation is determined to be satisfied, and the next microoperation specified by the branch condition is obtained. The datapath configuration for the next microoperation is then provided to the configuration pipeline. It should be noted that certain microoperations can be issued without a corresponding data element. A nop (no operation) is an example of such a microoperation, and a datapath configuration to disable the inputs and the register enables in the computational circuit blocks can traverse down the configuration pipeline without any input data element when executing the nop.

Figure 10:
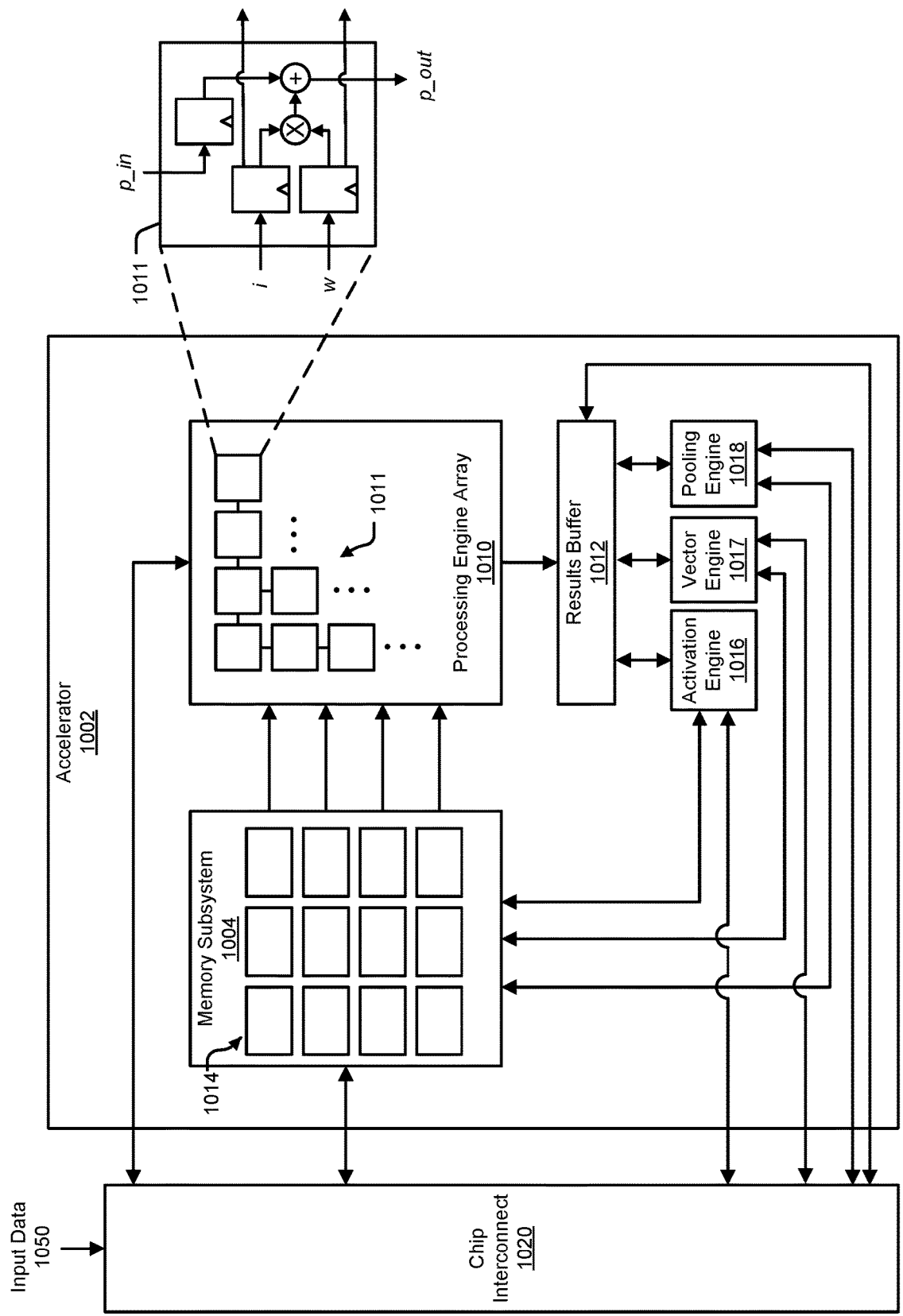
FIG. 10 illustrates a block diagram of an example of an integrated circuit device.

FIG. 10 is a block diagram illustrating an example of an integrated circuit device that can include an accelerator 1002. In various examples, the accelerator 1002, for a set of input data (e.g., input data 1050), can execute computations using a processing engine array 1010, an activation engine 1016, a vector engine 1017, and/or a pooling engine 1018. In some examples, the example accelerator 1002 may be an integrated circuit component of a processor, such as a neural network processor. The processor may have other integrated circuit components, including additional accelerator engines.

In various implementations, the memory subsystem 1004 can include multiple memory banks 1014. Memory subsystem 1004 can also be referred to as a state buffer. In these implementations, each memory bank 1014 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1014. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1004 can permit simultaneous access to the read or write channels of multiple memory banks. As another example, the memory subsystem 1004 can include arbitration logic such that arbitration between, for example, the outputs of multiple memory banks 1014 can result in more than one memory bank's output being used. In these and other examples, though globally managed by the memory subsystem 1004, each memory bank can be operated independently of any other.

Having the memory banks 1014 be independently accessible can increase the efficiency of the accelerator 1002. For example, values can be simultaneously read and provided to each row of the processing engine array 1010, so that the entire processing engine array 1010 can be in use in one clock cycle. As another example, the memory banks 1014 can be read at the same time that results computed by the processing engine array 1010 are written to the memory subsystem 1004. In contrast, a single memory may be able to service only one read or write at a time. With a single memory, multiple clock cycles can be required, for example, to read input data for each row of the processing engine array 1010 before the processing engine array 1010 can be started.

In various implementations, the memory subsystem 1004 can be configured to simultaneously service multiple clients, including the processing engine array 1010, the activation engine 1016, the vector engine 1017, the pooling engine 1018, and any external clients that access the memory subsystem 1004 over a communication fabric 1020. In some implementations, being able to service multiple clients can mean that the memory subsystem 1004 has at least as many memory banks as there are clients. In some cases, each row of the processing engine array 1010 can count as a separate client. In some cases, each column of the processing engine array 1010 can output a result, such that each column can count as a separate write client. In some cases, output from the processing engine array 1010 can be written into the memory banks 1014 that can then subsequently provide input data for the processing engine array 1010. As another example, the activation engine 1016, the vector engine 1017, and the pooling engine 1018 can include multiple execution channels, each of which can be separate memory clients. The memory banks 1014 can be implemented, for example, using static random access memory (SRAM).

In various implementations, the memory subsystem 1004 can include control logic. The control logic can, for example, keep track of the address spaces of each of the memory banks 1014, identify memory banks 1014 to read from or write to, and/or move data between the memory banks 1014. In some implementations, memory banks 1014 can be hardwired to particular clients. For example, a set of memory banks 1014 can be hardwired to provide values to the rows of the processing engine array 1010, with one memory bank servicing each row. As another example, a set of memory banks can be hard wired to receive values from columns of the processing engine array 1010, with one memory bank receiving data for each column.

The processing engine array 1010 is the computation matrix of the example accelerator 1002. The processing engine array 1010 can, for example, execute parallel integration, convolution, correlation, and/or matrix multiplication, among other things. The processing engine array 1010 includes multiple processing engines 1011, arranged in rows and columns, such that results output by one processing engine 1011 can be input directly into another processing engine 1011. Processing engines 1011 that are not on the outside edges of the processing engine array 1010 thus can receive data to operate on from other processing engines 1011, rather than from the memory subsystem 1004.

In various examples, the processing engine array 1010 uses systolic execution, in which data arrives at each processing engine 1011 from different directions at regular intervals. In some examples, input data can flow into the processing engine array 1010 from the left and weight values can be loaded at the top. In some examples weights and input data can flow from the left and partial sums can flow from top to bottom. In these and other examples, a multiply-and-accumulate operation moves through the processing engine array 1010 as a diagonal wave front, with data moving to the right and down across the array. Control signals can be input at the left at the same time as weights, and can flow across and down along with the computation.

In various implementations, the number of columns in the processing engine array 1010 determines the computational capacity of the processing engine array 1010, and the number of rows determines the required memory bandwidth for achieving maximum utilization of the processing engine array 1010. The processing engine array 1010 can have, for example, 64 columns and 128 rows, or some other number of columns and/or rows.

An example of a processing engine 1011 is illustrated in FIG. 10 in an inset diagram. As illustrated by this example, a processing engine 1011 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1011.

In the illustrated example, an input from above can include a partial sum, p in, provided either from another processing engine 1011 or from a previous round of computation by the processing engine array 1010. When starting a computation for a new set of input data, the top row of the processing engine array 1010 can receive a fixed value for p in, such as zero. As illustrated by this example, i and w are multiplied together and the result is summed with p in to produce a new partial sum, p out, which can be input into another processing engine 1011. Various other implementations of the processing engine 1011 are possible.

Outputs from the last row in the processing engine array 1010 can be temporarily stored in the results buffer 1012. The results can be intermediate results, which can be written to the memory banks 1014 to be provided to the processing engine array 1010 for additional computation. Alternatively, the results can be final results, which, once written to the memory banks 1014 can be read from the memory subsystem 1004 over the communication fabric 1020, to be output by the system.

In some implementations, the accelerator 1002 includes an activation engine 1016. In these implementations, the activation engine 1016 can combine the results from the processing engine array 1010 into one or more output activations. For example, for a convolutional neural network, convolutions from multiple channels can be summed to produce an output activation for a single channel. In other examples, accumulating results from one or more columns in the processing engine array 1010 may be needed to produce an output activation for a single node in the neural network. In some examples, activation engine 1016 can be bypassed.

In various examples, the activation engine 1016 can include multiple separate execution channels. In these examples, the execution channels can correspond to the columns of the processing engine array 1010, and can perform an operation on the outputs of a column, the result of which can be stored in the memory subsystem 1004. In these examples, the activation engine 1016 may be able to perform between 1 and n parallel computations, where n is equal to the number of columns in the processing engine array 1010. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1002 can include a pooling engine 1018. Pooling is the combining of outputs of the columns of the processing engine array 1010. Combining can include for example, computing a maximum value, a minimum value, an average value, a median value, a summation, a multiplication, or another logical or mathematical combination. In various examples, the pooling engine 1018 can include multiple execution channels that can operating on values from corresponding columns of the processing engine array 1010. In these examples, the pooling engine 1018 may be able to perform between 1 and n parallel computations, where n is equal to the number of columns in the processing engine array 1010. In various examples, execution channels of the pooling engine 1018 can operate in parallel and/or simultaneously. In some examples, the pooling engine 1018 can be bypassed.

In some implementations, the accelerator 1002 can further include a vector engine 1017. Vector engine 1017 is a compute engine that can perform computations and manipulations on values stored in memory subsystem 1004 and/or results buffer 1012 such as values representing matrices of input values, weight values, intermediate results, etc. Vector engine 1017 can also be referred to as a vector compute engine, and can be implemented, for example using execution engine 400 in some implementations. Vector engine 1017 can include multiple execution channels each with a pipeline of computation circuit blocks (e.g., arithmetic logic units) to perform complex computations such as nested multiply-and-add operations and/or complex manipulations such as sorting operations. In some implementations, the execution channels can be implemented using, for example, compute channel 250 or 300. In various examples, execution channels of the vector engine 1017 can operate in parallel and/or simultaneously. In some examples, the vector engine 1017 can be bypassed or be omitted.

Herein, the activation engine 1016, the vector engine 1017, and the pooling engine 1018 may be referred to collectively as execution engines. The processing engine array 1010 is another example of an execution engine. Another example of an execution engine is a Direct Memory Access (DMA) engine, which may be located outside the accelerator 1002.

Input data 1050 can arrive over the communication fabric 1020. The communication fabric 1020 can connect the accelerator 1002 to other components of a processor, such as a DMA engine that can obtain input data 1050 from an Input/Output (I/O) device, a storage drive, or a network interface. The input data 1050 can be, for example one-dimensional data, such as a character string or numerical sequence, or two-dimensional data, such as an array of pixel values for an image or frequency and amplitude values over time for an audio signal. In some examples, the input data 1050 can be three-dimensional, as may be the case with, for example, the situational information used by a self-driving car or virtual reality data. In some implementations, the memory subsystem 1004 can include a separate buffer for the input data 1050. In some implementations, the input data 1050 can be stored in the memory banks 1014 when the accelerator 1002 receives the input data 1050.

In some examples, the accelerator 1002 can implement a neural network processing engine. In these examples, the accelerator 1002, for a set of input data 1050, can execute a neural network to perform a task for which the neural network was trained. Executing a neural network on a set of input data can be referred to as inference or performing inference.

The weights for the neural network can be stored in the memory subsystem 1004, along with input data 1050 on which the neural network will operate. The neural network can also include instructions, which can program the processing engine array 1010 to perform various computations on the weights and the input data. The instructions can also be stored in the memory subsystem 1004, in the memory banks 1014 or in a separate instruction buffer. The processing engine array 1010 can output intermediate results, which represent the outputs of individual layers of the neural network. In some cases, the activation engine 1016, the vector engine 1017, and/or pooling engine 1018 may be enabled for computations called for by certain layers of the neural network. The accelerator 1002 can store the intermediate results in the memory subsystem 1004 for inputting into the processing engine array 1010 to compute results for the next layer of the neural network. The processing engine array 1010 can further output final results from a last layer of the neural network. The final results can be stored in the memory subsystem 1004 and then be copied out to host processor memory or to another location.

Figure 11:
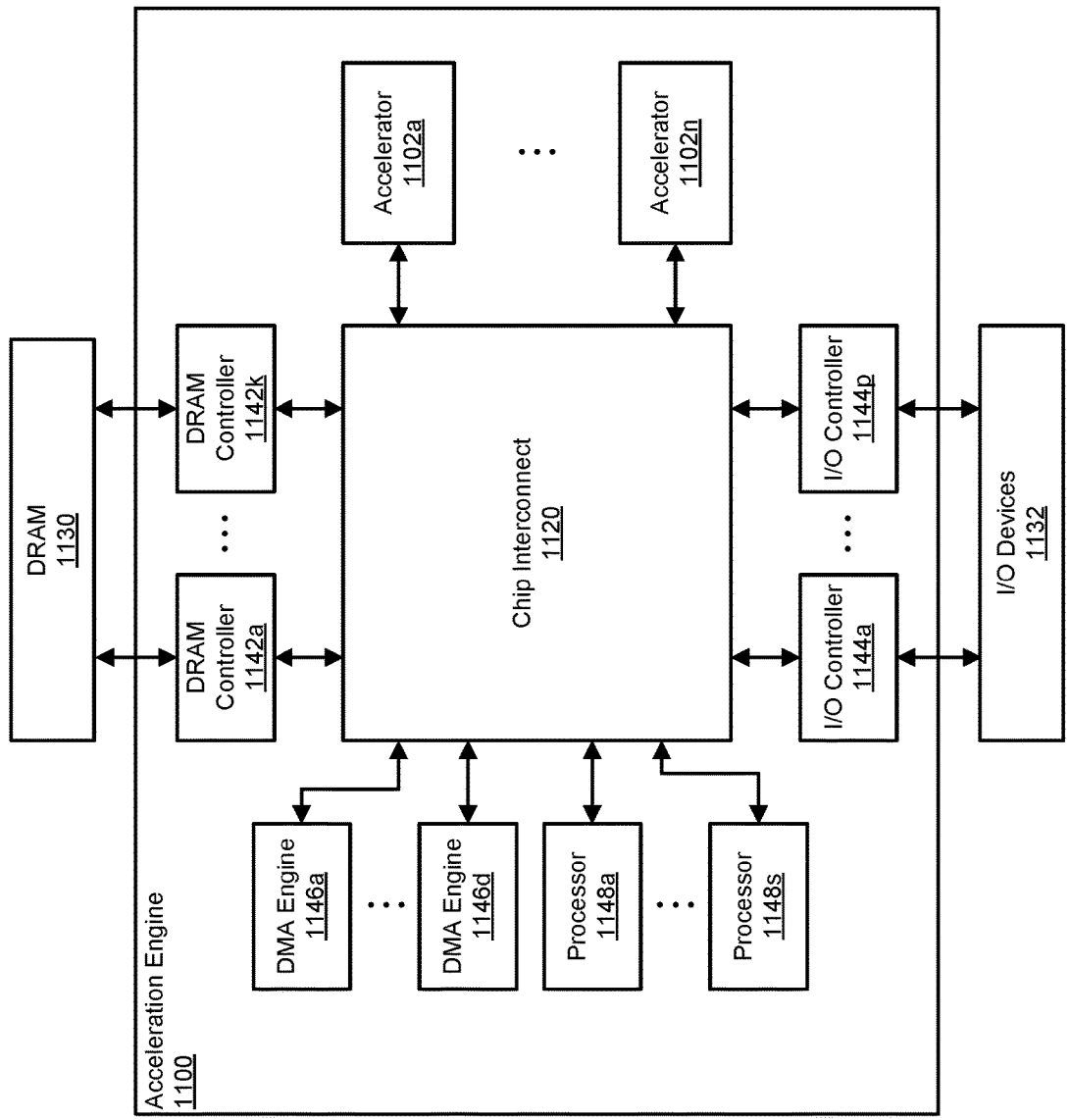
FIG. 11 illustrates a block diagram of an example of an acceleration engine.

FIG. 11 includes a block diagram that illustrates an example of an acceleration engine 1100. The acceleration engine 1100 is an example of an integrated circuit that can include one or more accelerators 1102*a*-1102*n* that may be similar to the accelerator illustrated in FIG. 10.

In the example of FIG. 11, the acceleration engine 1100 includes multiple accelerators 1102*a*-1102*n*, each of which can perform a set of operations. In various examples, the accelerators 1102*a*-1102*n* are for particular types of operations, so that the accelerators 1102*a*-1102*n* can perform the operations much faster than when similar operations are performed by a general-purpose processor. In various examples, to perform a set of operations, input data on which the operations are to be performed must first be moved into the accelerators 1102*a*-1102*n*. Additionally, in some cases, program code is also moved into the accelerators 1102*a*-1102*n*, which programs the operations that the accelerators 1102*a*-1102*n* will perform on the data. In the illustrated example, the acceleration engine 1100 includes n accelerators 1102*a*-1102*n*. Examples of accelerators that can be included in the acceleration engine 1100 include graphics accelerators, floating point accelerators, neural network accelerators, and others. In various examples, the accelerators 1102*a*-1102*n* can each be the same (e.g., each of the is a graphics accelerator) or can be different (e.g., the accelerators 1102*a*-1102*n* include a graphics accelerator, a floating point accelerator, and neural network accelerator).

The example acceleration engine 1100 further includes DRAM controllers 1142*a*-1142*k* for communicating with an external memory. The external memory is implemented, in this example, using DRAM 1130. In the illustrated example, the acceleration engine 1100 includes k DRAM controllers 1142*a*-1142*k*, each of which may be able to communicate with an independent set of banks of DRAM. In other examples, other types of RAM technology can be used for the external memory. The DRAM controllers 1142*a*-1142*k* can also be referred to as memory controllers.

In various examples, input data and/or program code for the accelerators 1102*a*-1102*n* can be stored in the DRAM 1130. Different programs can cause the accelerators 1102*a*-1102*n* to perform different operations. For example, when one of the accelerators is a neural network accelerator, one program can configure the neural network accelerator to perform speech recognition while another program can configure the neural network accelerator to perform image recognition. In various examples, different accelerators 1102*a*-1102*n* can be programmed with different programs, so that each performs a different set of operations. In various examples, the processors 1148*a*-1148*s* can manage moving of program code from the DRAM 1130 to the accelerators 1102*a*-1102*n*.

The example acceleration engine 1100 further includes I/O controllers 1144*a*-1144*p* for communicating with I/O devices 1132 in the system. The acceleration engine 1100 can communicate with I/O devices over, for example, a processor bus. In some examples, the processor bus can be implemented using Peripheral Component Interconnect (PCI) and/or a variation of the PCI bus protocol. The processor bus can connect the acceleration engine 1100 to I/O devices such as, for example, input and output devices, memory controllers, storage devices, and/or network interface cards, among other things. In some examples, the I/O controllers 1144*a*-1144*p* can enable the acceleration engine 1100 to act as an I/O device for a host processor. For example, the acceleration engine 1100 can be the recipient of input data from the host processor, and a command indicating an operation to be performed on the input data (e.g., a particular computation or analysis). In the illustrated example, the acceleration engine 1100 includes p I/O controllers 1144*a*-1144*p*, each of which may include a separate root complex and may communicate with a separate set of I/O devices 1132. In other examples, other standardized bus protocols, such as Ultra Path Interconnect (UPI) can be used for the host bus. In other examples, a proprietary bus protocol can be used.

Movement of data in the acceleration engine 1100 can be managed by one or more processors 1148*a*-1148*s*, which can also be referred to as data management processors. In the example of FIG. 11, the acceleration engine 1100 includes s processors 1148*a*-1148*s* incorporated into the device (e.g., on the same silicon die). In other examples, the processors 1148*a*-1148*s* can be external to the acceleration engine 1100 (e.g., on a different die and/or in a different package). In some examples, the processors 1148*a*-1148*s* can manage the movement of data from I/O devices 1132 to the accelerators 1102*a*-1102*n* or the DRAM 1130. For example, input data may be located at an I/O device 1132 or in processor memory, and the processors 1148*a*-1148*s* can move the input from the I/O device 1132 or processor memory into an accelerator or into DRAM 1130. As another example, program code for the accelerators 1102*a*-1102*n* may be located on an I/O device 1132 or in processor memory.

The example acceleration engine 1100 further includes DMA engines 1146*a*-1146*d* that can move data between the accelerators 1102*a*-1102*n*, DRAM controllers 1142*a*-1142*k*, and I/O controllers 1144*a*-1144*p*. In the illustrated example, the acceleration engine 1100 includes d DMA engines 1146*a*-1146*d*. In some implementations, the DMA engines 1146*a*-1146*d* can be assigned to specific tasks, such as moving data from the DRAM controllers 1142*a*-1142*d* to the accelerators 1102*a*-1102*n*, or moving data between the I/O controllers 1144*a*-1144*p* and the accelerators 1102*a*-1102*n*. These tasks can be assigned, for example, by enqueuing descriptors with the DMA engines 1146*a*-1146*d*, where a descriptor identifies an address for a block of data and an operation (e.g., a read or a write) to perform. A descriptor, for example, can direct a DMA engine to instruct a DMA controller to read a block of data from DRAM 1130. A descriptor can, as a further example, instruct the DMA engine to write data, read by the DMA controller, to an accelerator. Further descriptors can be used to move data from an accelerator to DRAM 1130.

In various examples, each of the processors 1148*a*-1148*s* can be responsible for managing the data movement for a different accelerator. In some examples, a processor may manage the data movement for more than one accelerator. Similarly, in various examples, each of the processors 1148*a*-1148*s* can be assigned to one or more DMA engines 1146*a*-1146*d*. In these and other examples, associations between processors 1148*a*-1148*s*, accelerators 1102*a*-1102*n*, and DMA engines 1146*a*-1146*d* are determined by program code being executed by each respective processor.

In the example acceleration engine 1100, the various components can communicate over a chip interconnect 1120. The chip interconnect 1120 primarily includes wiring for routing data between the components of the acceleration engine 1100. In some cases, the chip interconnect 1120 can include a minimal amount of logic, such as multiplexors to control the direction of data, flip-flops for handling clock domain crossings, and timing logic.

Figure 12:
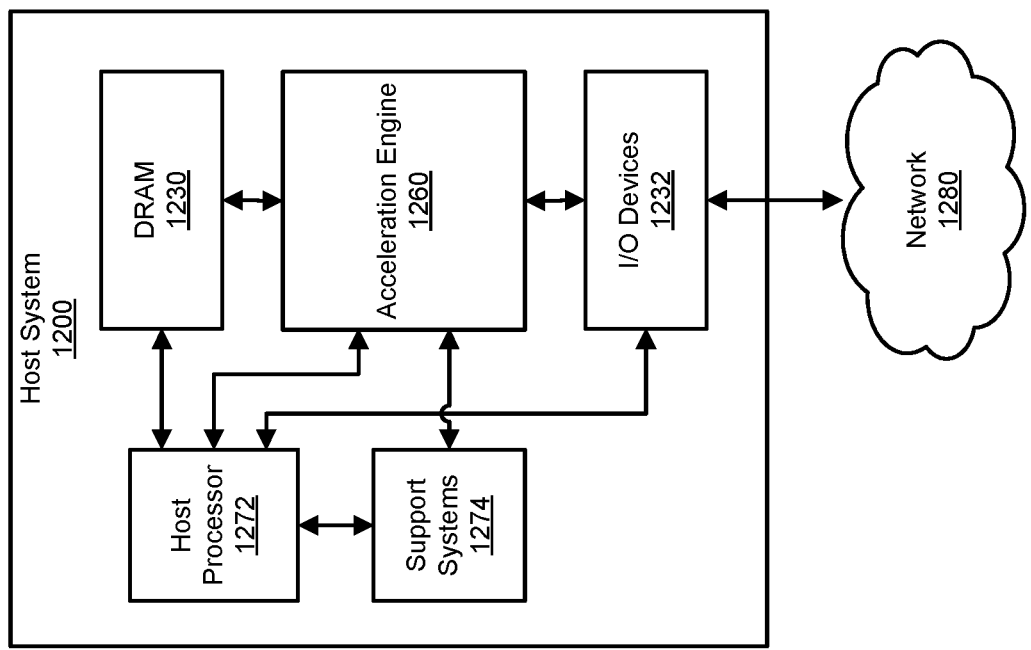
FIG. 12 illustrates a block diagram of an example of a host system.

FIG. 12 includes a block diagram that illustrates an example of a host system 1200 in which an acceleration engine 1260 can be used. The acceleration engine 1260 of FIG. 12 is an example of a device that can include one or more accelerators such as is illustrated in FIG. 11. The example host system 1200 of FIG. 12 includes the acceleration engine 1260, a host processor 1272, DRAM 1230 or processor memory, I/O devices 1232, and support systems 1274. In various implementations, the host system 1200 can include other hardware that is not illustrated here.

The host processor 1272 is a general-purpose integrated circuit that is capable of executing program instructions. In some examples, the host processor 1272 can include multiple processing cores. A multi-core processor may include multiple processing units within the same processor. In some examples, the host system 1200 can include more than one host processor 1272. In some examples, the host processor 1272 and the acceleration engine 1260 can be one chip, such as, one or more integrated circuits within the same package.

In various examples, the host processor 1272 can communicate with other components in the host system 1200 over one or more communication channels. For example, the host system 1200 can include a host processor bus, which the host processor 1272 can use to communicate with the DRAM 1230, for example. As another example, the host system 1200 can include an I/O bus, such as a PCI-based bus, over which the host processor 1272 can communicate with the acceleration engine 1260 and/or the I/O devices 1232, for example. In various examples, the host system 1200 can, alternatively or additionally, include other communication channels or busses, such as serial busses, power management busses, storage device busses, and so on.

In some examples, software programs executing on the host processor 1272 can receive or generate input for processing by the acceleration engine 1260. In some examples, the programs can select an appropriate neural network to execute for a given input. For example, a program may be for language translation, and can select one or more neural networks capable of speech recognition and/or machine translation. In these and other examples, the programs can configure the acceleration engine 1260 with the neural network to execute, and/or can select a neural network processing engine on the acceleration engine 1260 that has previously been configured to execute the desired neural network. In some examples, once the acceleration engine 1260 has started an inference on input data, the host processor 1272 can manage the movement of data (such as weights, instructions, intermediate results, results of conditional layers, and/or final results) into or out of the acceleration engine 1260.

In some examples, a software program that is using the acceleration engine 1260 to conduct an inference can read the result from a conditional layer from the acceleration engine 1260 and/or from a storage location, such as in DRAM 1230. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1230 is memory that is used by the host processor 1272 for storage of program code that the host processor 1272 is in the process of executing, as well as values that are being operated on. In some examples, the data for a neural network (e.g., weight values, instructions, and other data) can be all or partially stored in the DRAM 1230. DRAM is a common term for processor memory, and though DRAM is volatile memory, processor memory can be volatile and/or non-volatile. Though not illustrated here, the host system 1200 can include other volatile and non-volatile memories for other purposes. For example, the host system 1200 can include a Read-Only Memory (ROM) that stores boot code for booting the host system 1200 at power on, and/or Basic Input/Output System (BIOS) code.

Though not illustrated here, the DRAM 1230 can store instructions for various programs, which can be loaded into and be executed by the host processor 1272. For example, the DRAM 1230 can be storing instructions for an operating system, one or more data stores, one or more application programs, one or more drivers, and/or services for implementing the features disclosed herein.

The operating system can manage and orchestrate the overall operation of the host system 1200, such as scheduling tasks, executing applications, and/or controller peripheral devices, among other operations. In some examples, a host system 1200 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1200. For example, some drivers can provide communication between the operating system and peripheral devices or I/O devices 1232. Alternatively or additionally, some drivers may provide communication between application programs and the operating system, and/or application programs and peripheral devices accessible to the host system 1200. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1232 can include hardware for connecting to user input and output devices, such as keyboards, mice, pens, tablets, voice input devices, touch input devices, displays or monitors, speakers, and printers, among other devices. The I/O devices 1232 can also include storage drives and/or network interfaces for connecting to a network 1280. For example, the host system 1200 can use a network interface to communicate with storage devices, user terminals, other computing devices or servers, and/or other networks, among various examples.

In various examples, one or more of the I/O devices 1232 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1200 or may be in an external enclosure. A storage device can be fixed (e.g., attached by screws) or removable (e.g., having a physical release mechanism and possibly a hot-plug mechanism).

Storage devices, the DRAM 1230, and any other memory component in the host system 1200 are examples of computer-readable storage media. Computer-readable storage media are physical mediums that are capable of storing data in a format that can be read by a device such as the host processor 1272. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1232 can be PCI-based devices. In these examples, a PCI-based I/O device includes a PCI interface for communicating with the host system 1200. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1274 can include hardware for coordinating the operations of the acceleration engine 1260. For example, the support systems 1274 can include a microprocessor that coordinates the activities of the acceleration engine 1260, including moving data around on the acceleration engine 1260. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1272. In some examples, the program executed by the microprocessor is stored on the hardware of microprocessor, or on a non-volatile memory chip in the host system 1200. In some examples, the microprocessor and the acceleration engine 1260 can be on chip, such as one integrated circuit on the same die and in the same package.

In some examples, the support systems 1274 can be responsible for taking instructions from the host processor 1272 when programs executing on the host processor 1272 request the execution of a neural network. For example, the host processor 1272 can provide the support systems 1274 with a set of input data and a task that is to be performed on the set of input data. In this example, the support systems 1274 can identify a neural network that can perform the task, and can program the acceleration engine 1260 to execute the neural network on the set of input data. In some examples, the support systems 1274 only needs to select an appropriate neural network processing engine of the neural network processor. In some examples, the support systems 1274 may need to load the data for the neural network onto the acceleration engine 1260 before the acceleration engine 1260 can start executing the neural network. In these and other examples, the support systems 1274 can further receive the output of executing the neural network, and provide the output back to the host processor 1272.

In some examples, the operations of the support systems 1274 can be handled by the host processor 1272. In these examples, the support systems 1274 may not be needed and can be omitted from the host system 1200.

In various examples, the host system 1200 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1200 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
a compute channel including a plurality of computational circuit blocks coupled in series in a pipeline;
a control table storing control entries corresponding to respective microoperations, each control entry including control flow information for branching to a next microoperation;
a datapath table storing datapath configuration entries corresponding to respective microoperations, each datapath configuration entry including a plurality of computational circuit block configurations to configure the plurality of computational circuit blocks;
an opcode table storing opcode entries corresponding to respective opcodes, each opcode entry including a pointer that is used to access the control table and the datapath table;
an instruction decoder operable to:
receive a machine instruction to perform a computation on an input tensor to generate an output tensor;
decode the machine instruction to obtain an opcode;
access the opcode table using the opcode from the machine instruction to obtain a pointer for a microoperation of the machine instruction; and
use the pointer for the microoperation of the machine instruction to access a first control entry in the control table to obtain control flow information for the microoperation of the machine instruction, and access a datapath configuration entry in the datapath table to obtain a datapath configuration for the microoperation of the machine instruction; and
a control logic circuit operable to:
issue the microoperation of the machine instruction to the compute channel by configuring the compute channel with the first control entry and the datapath configuration for the microoperation of the machine instruction.

2. The integrated circuit device of claim 1, wherein the control logic circuit is operable to:
determine that a branch condition in the microoperation of the machine instruction is satisfied, the branch condition in the microoperation of the machine instruction associated with a next microoperation of the machine instruction;
identify the next microoperation associated with the branch condition in the microoperation of the machine instruction;
access a second control entry in the control table to obtain control flow information for the next microoperation associated with the branch condition in the microoperation of the machine instruction, and access a datapath configuration entry in the datapath table to obtain a datapath configuration for the next microoperation associated with the branch condition in the microoperation of the machine instruction; and
issue the next microoperation associated with the branch condition in the microoperation of the machine instruction to the compute channel by configuring the compute channel with the second control entry and the datapath configuration for the next microoperation associated with the branch condition in the microoperation of the machine instruction.

3. The integrated circuit device of claim 2, wherein the branch condition is one of a plurality of branch conditions set for the microoperation of the machine instruction.

4. The integrated circuit device of claim 1, wherein the control logic circuit is operable to wait until a data element of the input tensor is available from memory before issuing the microoperation of the machine instruction to the compute channel.

5. The integrated circuit device of claim 4, wherein the control logic circuit is operable to issue a no-operation (nop) to the compute channel while waiting for the data element of the input tensor to become available.

6. The integrated circuit device of claim 5, wherein the input tensor is a first input tensor and the computation combines the first input tensor with a second input tensor, and wherein the control logic circuit is operable to wait until a data element of the second input tensor is available from the memory before issuing the microoperation of the machine instruction to the compute channel.

7. The integrated circuit device of claim 1, wherein the control logic circuit is operable to issue the microoperation of the machine instruction repeatedly to the compute channel before issuing a next microoperation.

8. A method comprising:
receiving a machine instruction for a compute channel having a plurality of computational circuit blocks coupled in series in a pipeline;
decoding the machine instruction to obtain an opcode;
using the opcode as an index to access an opcode entry in an opcode table, the opcode entry including a pointer to a first microoperation;
using the pointer to access the first microoperation represented by a control entry in a control table and a datapath configuration entry in a datapath table; and
issuing the first microoperation to the compute channel by configuring the compute channel with the control entry and the datapath configuration entry.

9. The method of claim 8, wherein the control entry includes control flow information containing a branch trigger setting including a branch condition and a next microoperation to branch to when the branch condition is satisfied.

10. The method of claim 9, wherein the branch trigger setting is one of a plurality of prioritized branch trigger settings in the control flow information of the control entry.

11. The method of claim 9, wherein the branch condition has a default setting to continuously issue the first microoperation.

12. The method of claim 11, wherein the branch condition is configurable to branch to the next microoperation when a counter value reaches a repeat count.

13. The method of claim 12, wherein the repeat count is a programmable field in the control entry.

14. The method of claim 11, wherein the first microoperation is in a set of microoperations being issued to the compute channel to execute the machine instruction.

15. The method of claim 14, comprising:
determining that a subdimension of an input tensor being serially inputted into the compute channel has rolled over; and
issuing a second microoperation in the set of microoperations to the compute channel in response to the subdimension rolling over.

16. The method of claim 15, comprising:
issuing a third microoperation in the set of microoperations to the compute channel in response to the compute channel having completed processing of the input tensor.

17. The method of claim 15, comprising:
issuing a third microoperation in the set of microoperations to the compute channel in response to the compute channel having completed generation of an output tensor specified in the machine instruction.

18. The method of claim 8, wherein the opcode entry includes a load parameter table setting to load a parameter table with values provided with the machine instruction.

19. The method of claim 8, comprising:
rearranging an input tensor based on the machine instruction; and
inputting data elements of the rearranged input tensor into the compute channel.

20. The method of claim 8, wherein the compute channel includes a plurality of compute stages coupled in series, and the datapath configuration includes a computational circuit block configuration for each of the compute stages in the compute channel.

\* \* \* \* \*